(12) United States Patent
Kanno et al.

(10) Patent No.: US 9,100,058 B2
(45) Date of Patent: Aug. 4, 2015

(54) ILLUMINATION OPTICAL SYSTEM, LIGHT IRRADIATION APPARATUS FOR SPECTROMETRY, AND SPECTROMETER

(75) Inventors: Masayoshi Kanno, Kanagawa (JP); Katsuhisa Orihara, Tochigi (JP); Norio Saito, Miyagi (JP); Satoru Sugita, Tochigi (JP)

(73) Assignee: SONY CORPORATION, Tokyo (JP)

( * ) Notice: Subject to any disclaimer, the term of this patent is extended or adjusted under 35 U.S.C. 154(b) by 132 days.

(21) Appl. No.: 13/880,917

(22) PCT Filed: Oct. 21, 2011

(86) PCT No.: PCT/JP2011/074268
§ 371 (c)(1),
(2), (4) Date: Apr. 22, 2013

(87) PCT Pub. No.: WO2012/057015
PCT Pub. Date: May 3, 2012

(65) Prior Publication Data
US 2013/0217327 A1    Aug. 22, 2013

(30) Foreign Application Priority Data
Oct. 29, 2010   (JP) ................................ 2010-244648

(51) Int. Cl.
H04B 5/00  (2006.01)
(52) U.S. Cl.
CPC .................................... H04B 5/0056 (2013.01)
(58) Field of Classification Search
CPC .................................................... H04B 5/0056

USPC ......................................................... 455/41.1
See application file for complete search history.

(56) References Cited

U.S. PATENT DOCUMENTS

| | | | |
|---|---|---|---|
| 8,634,772 B2* | 1/2014 | Kanno | 455/41.1 |
| 2003/0006880 A1* | 1/2003 | Zimmer | 340/10.34 |
| 2004/0099738 A1* | 5/2004 | Waters | 235/451 |
| 2006/0220863 A1* | 10/2006 | Koyama | 340/572.1 |
| 2008/0012712 A1* | 1/2008 | Shimizu | 340/572.5 |
| 2008/0252549 A1* | 10/2008 | Ohtaki et al. | 343/861 |
| 2008/0258984 A1* | 10/2008 | Adachi et al. | 343/745 |
| 2010/0001839 A1* | 1/2010 | Uchiyama et al. | 340/10.1 |
| 2011/0128222 A1* | 6/2011 | Hirota et al. | 345/158 |

FOREIGN PATENT DOCUMENTS

| | | |
|---|---|---|
| JP | 2003-323595 | 11/2003 |
| JP | 2008-160312 | 7/2008 |
| WO | 2008/050777 | 5/2008 |

* cited by examiner

*Primary Examiner* — David Bilodeau
(74) *Attorney, Agent, or Firm* — K&L Gates LLP

(57) ABSTRACT

Provided is a portable communication device including a receiver, a transmitter, an adjustment signal generator, an adjustment signal detector, and a control circuit unit. The transmitter transmits an adjustment signal to the receiver in order to adjust a received resonant frequency. The adjustment signal detector detects a parameter including information on a transmission state of the adjustment signal at a time of transmitting the adjustment signal. Then, the control circuit unit corrects a deviation of the received resonant frequency based on a detection result of the adjustment signal detector.

15 Claims, 19 Drawing Sheets

BLOCK CONFIGURATION OF NON-CONTACT COMMUNICATION UNIT OF FIRST EMBODIMENT

SCHEMATIC CONFIGURATIONS OF RECEPTION CIRCUIT AND
TRANSMISSION CIRCUIT OF FIRST EMBODIMENT

BLOCK CONFIGURATION OF MEASUREMENT SYSTEM USED
IN VERIFICATION EXPERIMENT

RESULT 2 OF VERIFICATION EXPERIMENT 3

RESULT 3 OF VERIFICATION EXPERIMENT 3

RESULT 4 OF VERIFICATION EXPERIMENT 3

FLOWCHART OF RESONANT FREQUENCY
ADJUSTMENT TECHNIQUE 1 OF FIRST EMBODIMENT

FLOWCHART OF RESONANT FREQUENCY
ADJUSTMENT TECHNIQUE 2 OF FIRST EMBODIMENT

FLOWCHART OF RESONANT FREQUENCY
ADJUSTMENT TECHNIQUE 3 OF FIRST EMBODIMENT

FLOWCHART OF RESONANT FREQUENCY
ADJUSTMENT TECHNIQUE 4 OF FIRST EMBODIMENT

REFERENCE DATA 1

REFERENCE DATA 2

FLOWCHART OF RESONANT FREQUENCY ADJUSTMENT TECHNIQUE 1

FLOWCHART OF RESONANT FREQUENCY ADJUSTMENT TECHNIQUE 2

BLOCK CONFIGURATION OF R/W OF FOURTH EMBODIMENT

ILLUMINATION OPTICAL SYSTEM, LIGHT IRRADIATION APPARATUS FOR SPECTROMETRY, AND SPECTROMETER

CROSS REFERENCES TO RELATED APPLICATIONS

The present application is a national stage of International Application No. PCT/JP2011/074268 filed on Oct. 21, 2011 and claims priority to Japanese Patent Application No. 2010-244648 filed on Oct. 29, 2010, the disclosure of which is incorporated herein by reference.

BACKGROUND

The present invention relates to a portable communication device including a function of conducting communication with an external device in a non-contact manner by electromagnetic induction, a reader/writer device, and a resonant frequency adjustment method in the devices.

Nowadays a non-contact communication system in which non-contact IC (Integrated Circuit) cards, such as a traffic ticket and electronic money, are used becomes significantly widespread. In such a non-contact communication system, a transmission signal (electromagnetic wave) emitted from a transmission antenna (a resonant circuit) of a reader/writer (hereinafter abbreviated to as R/W) device dedicated to the system is received by the electromagnetic induction using a reception antenna provided in the non-contact IC card.

In the non-contact communication system, a resonant frequency of the reception antenna of the non-contact IC card or the transmission antenna of the R/W device changes by surrounding environments, such as temperature, humidity, and a peripheral device. In this case, it is difficult to stably transmit and receive information between the non-contact IC card and the R/W device.

Therefore, conventionally there are proposed various technologies for adjusting a deviation of the resonant frequency in the non-contact communication system (for example, see Patent Literatures 1 and 2).

Patent Literature 1 proposes a technique of adjusting the deviation of the resonant frequency (a received resonant frequency) of the non-contact IC card. Specifically, the R/W device transmits a signal to the non-contact IC card while sweeping a transmission frequency (changing a time), thereby detecting the deviation of the resonant frequency of the non-contact IC card. The non-contact IC card acquires the detection result from the R/W device, and adjusts the own resonant frequency based on the detection result.

Patent Literature 2 proposes a technique of mainly adjusting the deviation of the resonant frequency (a transmission resonant frequency) of the R/W device (a wireless communication device). Specifically, a resonant frequency adjusting electromagnetic wave is transmitted from the antenna, and a transmission electric power is detected in the transmission circuit at that time. The detected transmission electric power is compared to a predetermined threshold to adjust the resonant frequency.

Conventionally there are also developed portable communication devices, such as a mobile communication terminal, which include both the same function (hereinafter referred to as an IC card function) as the non-contact IC card and the same function (hereinafter referred to as an R/W function) as the R/W device.

CITATION LIST

Patent Literature

Patent Literature 1: JP-A-2009-111483
Patent Literature 2: JP-A-2008-160312

SUMMARY

Technical Problem

In the portable communication device including both the IC card function and the R/W function, the resonant frequency of the IC card function (the reception antenna) changes by various causes. Specifically, the resonant frequency changes by the following causes (1) to (5).
(1) An influence of a production variation of a component of each functional unit
(2) An influence of a change with time or component exchange of the component after shipment
(3) Characteristic degradation by changes of surrounding environments, such as temperature and humidity
(4) An influence of decoration products, such as a seal, which are put on the portable communication device
(5) An influence of the external R/W device Therefore, nowadays there is a demand for a development of a technology to deal with the deviation of the resonant frequency of the reception antenna, which is generated by various causes described above, in the portable communication device including both the IC card function and the R/W function.

The cause (1) can be dealt with by adjusting a capacitance (a capacitor) or an inductance (a coil), which constitutes a resonant circuit, in a process of shipping the device. However, this case generates a problem in that the capacitance or the inductance needs to be adjusted in each device. The cause (1) can be also dealt with using a component having a small characteristic variation. However, this case generates a problem in that the component becomes expensive to increase cost. The causes (4) and (5) are problems unique to the portable communication device that conducts non-contact communication by electromagnetic coupling.

The resonant frequency of the transmission antenna also changed by, for example, the causes (1) to (3) in not only the portable communication device including both the IC card function and the R/W function but also the R/W device. Therefore, in the R/W device, there is also demand for the development of the technology to be able to easily adjust the deviation of the resonant frequency.

The present invention has been devised to solve the problems described above. An object of the present invention is to be able to easily adjust the deviation of the resonant frequencies of the reception antenna and/or transmission antenna to obtain the stable communication characteristic in the portable communication device including both the IC card function and the R/W function. the R/W device, and the resonant frequency adjustment method thereof.

Solution to Problem

According to the first aspect of the present invention in order to achieve the above-mentioned object, there is provided a portable communication device including a receiver, a transmitter, an adjustment signal generator, an adjustment signal detector, and a control circuit unit. Each unit is constructed as follows. The receiver includes a reception antenna in which a received resonant frequency is variable, and the reception antenna conducts communication with an external reader/writer device by electromagnetic coupling. The transmitter includes a transmission antenna conducting communication with an external non-contact data carrier by the electromagnetic coupling, and the transmitter transmits an adjustment signal to the receiver in order to adjust the received resonant frequency. The adjustment signal generator generates the adjustment signal to output the adjustment signal to the transmitter. The adjustment signal detector detects a parameter including information on a transmission state of the adjustment signal. The control circuit unit corrects a deviation of the received resonant frequency based on a detection result of the adjustment signal detector.

According to the second aspect of the present invention in order to achieve the above-mentioned object, there is provided a reader/writer device including a transmitter, an adjustment signal generator, an adjustment signal detector, and a control circuit unit. Each unit is constructed as follows. The transmitter includes a transmission antenna in which transmission resonant frequency is variable, and the transmission antenna conducts communication with an external non-contact data carrier by the electromagnetic coupling. The adjustment signal generator generates an adjustment signal adjusting the transmission resonant frequency, and transmits the adjustment signal to the transmitter. The adjustment signal detector detects a parameter including information on a transmission state of the adjustment signal. The control circuit unit corrects a deviation of the transmission resonant frequency based on a detection result of the adjustment signal detector.

According to the third aspect of the present invention in order to achieve the above-mentioned object, there is provided a resonant frequency adjustment method performed by the following procedure. An adjustment signal is transmitted to a receiver in order to adjust a received resonant frequency. Then a parameter including information on a transmission state of the adjustment signal is detected. A deviation of the received resonant frequency is corrected based on the detected parameter for the adjustment signal.

Advantageous Effects of Invention

As described above, according to the portable communication device and resonant frequency adjustment method of the present invention, the parameter including the information on the transmission state of the adjustment signal is detected when the adjustment signal adjusting the received resonant frequency is transmitted to the receiver of the portable communication device. The received resonant frequency is adjusted based on the detected parameter.

According to the reader/writer device of the present invention, when the adjustment signal is transmitted to the transmitter, the parameter including the information on the transmission state of the adjustment signal is detected, and the transmission resonant frequency is adjusted based on the detection result.

That is, according to the present invention, even if the received resonant frequency and/or the transmission resonant frequency are deviated by various causes, the deviations of the resonant frequencies can easily adjusted in the own device, and the stable communication characteristic can be obtained.

Additional features and advantages are described herein, and will be apparent from the following Detailed Description and the figures.

DETAILED DESCRIPTION

Figure 1:
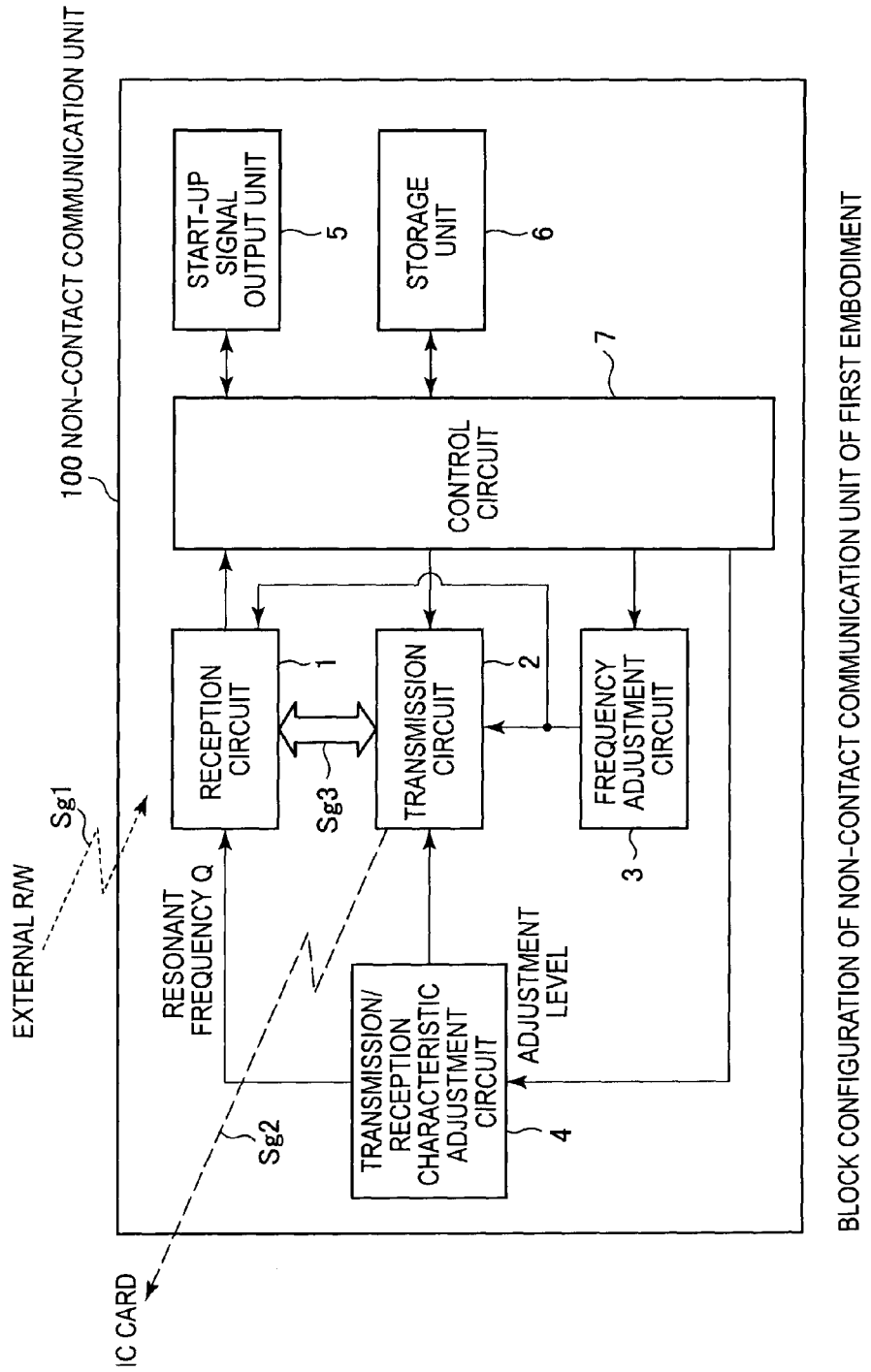
FIG. 1 is a block configuration diagram illustrating a non-contact communication unit of a mobile communication terminal according to a first embodiment of the present invention.

Hereinafter, a portable communication device, an R/W device, and a resonant frequency adjustment method according to embodiments of the present invention will be described in the following order with reference to the drawings. In the following embodiments, a mobile communication terminal is used as the portable communication device by way of example. As used herein, the mobile communication terminal means what is called a mobile phone terminal, and is a terminal device that conducts wireless communication with a wireless-telephone base station.

1. First embodiment: basic examples of mobile communication terminal and resonant frequency adjustment method
2. Second embodiment: configuration example of resonant frequency offset adjustment
3. Third embodiment: configuration example in which transmission/reception sharing antenna is used
4. Fourth embodiment: adjustment example of resonant frequency in R/W device
5. Various applications 1. First Embodiment

[Communication of Mobile Communication Terminal]

FIG. 1 illustrates a schematic configuration of a mobile communication terminal according to a first embodiment of the present invention. For the sake of convenience, only a configuration (hereinafter referred to as a non-contact communication unit) necessary for both an IC card function and an R/W function is illustrated in FIG. 1. However, a configuration except the non-contact communication unit may be identical to that of the conventional mobile communication terminal. In the first embodiment, an adjustment of a resonant frequency (the received resonant frequency) of a reception circuit system (the IC card function) in a non-contact communication unit is described by way of example.

A non-contact communication unit 100 includes a reception circuit 1, a transmission circuit 2 (the transmitter), a frequency adjustment circuit 3, a transmission/reception characteristic adjustment circuit 4, a start-up signal output unit 5, a storage unit 6, and a control circuit 7 (the control circuit unit). Each unit has the following function.

The reception circuit 1 is a circuit unit that mainly serves the IC card function. As described later, the reception circuit 1 includes a reception antenna, receives a signal (Sg1) transmitted from the external R/W device using the reception antenna, and demodulates the received signal to obtain reception information. In the first embodiment, the reception antenna of the reception circuit 1 is electromagnetically coupled to a transmission antenna of the transmission circuit 2, and receives an adjustment signal Sg3 in order to adjust the received resonant frequency transmitted from the transmission antenna. A specific internal configuration of the reception circuit 1 is described in detail later with reference to the drawing.

The transmission circuit 2 is a circuit unit that mainly serves the R/W function. As described later, the transmission circuit 2 includes the transmission antenna and transmits a signal (Sg2) including predetermined information to external non-contact data carriers, such as the mobile communication terminal, which include the non-contact IC card or the IC card function, using the transmission antenna.

The transmission circuit 2 is connected to the frequency adjustment circuit 3, and includes a function of varying a level (an amplitude) of adjustment signal Sg3 input from the frequency adjustment circuit 3. The transmission circuit 2 adjusts the adjustment signal Sg3, which is input from the frequency adjustment circuit 3, to a predetermined output level and transmits the level-adjusted adjustment signal Sg3 to the reception circuit 1. A specific internal configuration of the transmission circuit 2 is described in detail later with reference to the drawing.

The frequency adjustment circuit 3 generates the adjustment signal Sg3 and outputs the adjustment signal Sg3 to the reception circuit 1 and the transmission circuit 2. A specific internal configuration of the frequency adjustment circuit 3 is described in detail later with reference to the drawing.

The transmission/reception characteristic adjustment circuit 4 adjusts a reception characteristic of the reception circuit 1 and a transmission characteristic of the transmission circuit 2 such that the reception characteristic of the reception circuit 1 and the transmission characteristic of the transmission circuit 2 are optimized in the adjustment of the resonant frequency. Specifically, the transmission characteristic of the transmission circuit 2 is adjusted such that, in the adjustment of the resonant frequency, an operation has an influence on external devices (for example, the non-contact IC card and the mobile communication terminal with the IC card function). The reception characteristic of the reception circuit 1 is adjusted such that the received signal is extremely increased in the reception circuit 1 in the adjustment of the resonant frequency.

For example, an output terminal of the transmission/reception characteristic adjustment circuit 4 is connected to the transmission circuit 2, and the transmission/reception characteristic adjustment circuit 4 changes a signal level, a modulation technique, and a coding technique of the adjustment signal Sg3 from those during a normal operation to those in the adjustment of the resonant frequency. For example, the output terminal of the transmission/reception characteristic adjustment circuit 4 is also connected to the reception circuit 1, and the transmission/reception characteristic adjustment circuit 4 decreases a Q value (a Quality factor) indicating sensitivity of the reception circuit 1 in the adjustment of the resonant frequency.

Under a predetermined condition, the start-up signal output unit 5 outputs a start-up signal to the control circuit 7. The start-up signal indicates that an operating mode transitions from a normal operation mode (hereinafter referred to as a normal mode) of the IC card function or R/W function to a received resonant frequency adjustment mode (hereinafter referred to as an adjustment mode).

In the first embodiment, for example, resonant frequency adjustment processing can be performed not only in the factory shipment of the mobile communication terminal but also after the shipment. However, in the case that the mobile communication terminal is the R/W, the resonant frequency may properly be adjusted during non-contact communication after the shipment.

Specifically, for example, the following conditions can be used as the condition used to transition to the adjustment mode (to adjust the resonant frequency) after the shipment.
(1) Date and/or a day of the week
(2) Time
(3) Surrounding environment (for example, temperature and humidity)
(4) The time when the time mobile communication terminal is powered on
(5) The time when the communication error is generated
(6) The time when the carrier wave is detected (including the case that the carrier wave generated by itself is detected by the antenna of itself when the R/W function is operated to start the communication).
(7) The time when the carrier wave is not detected after detected for a given period For example, pieces of information on the start-up conditions (1) to (4) in the start-up conditions (1) to (7) are input to the start-up signal output unit 5 from a main controller (not illustrated) of the mobile communication terminal. On the other hand, pieces of information on the start-up conditions (5) to (7) are input from the control circuit 7 of the non-contact communication unit 100.

A user may set the start-up conditions (1) and (2). For example, when an adjustment mode implementation time is set late at night while commute time when a use frequency of the IC card function and/or the R/W function is relatively high is avoided, the communication operation does not overlap the adjustment mode in the commute time, but usability is improved. For example, when the adjustment mode is implemented at predetermined time intervals, the deviation of the resonant frequency caused by the change with time can be suppressed.

In the case that the adjustment mode is activated on the start-up condition (5), for example, the start-up signal output unit 5 detects a communication error flag to recognize a communication error. In this case, the communication (the normal mode) may forcedly be ended to transition to the adjustment mode. In the adjustment mode of the first embodiment, a Q value of the reception antenna is decreased to reduce the influence of the transmission signal of the external R/W device. However, in the case that the operating mode transitions forcedly to the adjustment mode in the generation of the communication error, preferably the Q value of the reception antenna is further decreased in order to reduce the influence of the transmission signal of the external R/W device. Therefore, the adjustment can be performed more stably.

In the case that the adjustment mode is activated on the start-up condition (7), for example, the received resonant frequency is adjusted in preparation for the next communication after a user passes through a ticket gate of a station using the IC card function of the mobile communication terminal.

For example, a technique of detecting communication ending by detecting a communication ending flag set at the end of the communication can be used as a technique of sensing that a carrier wave is not detected on the start-up condition (7). Alternatively, for example, a determination that the communication is conducted is made when the carrier wave is detected for a given period, and the time at which the carrier wave is not detected may be determined as the communication ending time to transition to the adjustment mode. For example, in the IC card function currently used in the ticket gate of the station, because the communication is ended in about 0.1 second, the determination that the communication is currently conducted is made when the carrier wave is detected for at least 0.1 second×0.5=0.05 second.

A result (for example, an optimum condition of the control voltage) obtained in the resonant frequency adjustment mode is stored in the storage unit 6. The storage unit 6 outputs the stored optimum condition to the transmission/reception characteristic adjustment circuit 4 through the control circuit 7. The transmission/reception characteristic adjustment circuit 4 sets resonant characteristics of the reception circuit 1 and/or transmission circuit 2 based on the optimum condition.

The storage unit 6 may include a function of outputting the stored optimum condition to the external storage device by wired communication/wireless communication. In this case, the storage unit 6 can read the optimum condition stored in the external storage unit to output the optimum condition to the transmission/reception characteristic adjustment circuit 4.

For example, the control circuit 7 is constructed by a CPU (Central Processing Unit), performs calculation processing to the output signal of the reception circuit 1, and outputs a calculation result to the transmission circuit 2 and the frequency adjustment circuit 3. Specifically, the control circuit 7 performs predetermined calculation processing and control to the output signal such that a signal level of the output signal of the reception circuit 1 becomes a predetermined threshold or less.

The control circuit 7 switches the operating mode of the non-contact communication unit 100 from the normal mode to the adjustment mode or from the adjustment mode to the normal mode based on a command signal (a start-up signal) output from the start-up signal output unit 5. The control circuit 7 outputs the command signal to each unit constituting the non-contact communication unit 100 to perform the operation in the adjustment mode.

During the operation in the adjustment mode, the control circuit 7 outputs a control signal (for example, a DC signal, an AC signal, and a PWM (Pulse Width Modulation) signal) to the reception circuit 1 through the transmission/reception characteristic adjustment circuit 4 in order to adjust the resonant frequency of the reception antenna.

Specifically, in the case that the resonant frequency of the reception antenna is changed by changing the control voltage applied to a variable resonance capacitor of the reception antenna (the reception circuit 1), the control circuit 7 outputs the control voltage to the reception circuit 1 through the transmission/reception characteristic adjustment circuit 4. In the case that the resonant frequency of the reception antenna of the reception circuit 1 is adjusted by switching plural capacitors having different capacitances, the control circuit 7 outputs a signal switching the plural capacitors to the reception circuit 1 through the transmission/reception characteristic adjustment circuit 4.

The control circuit 7 also outputs detection data and setting condition data, which are acquired in the adjustment mode, to the storage unit 6 or the external storage device.

[Configurations of Reception Circuit, Transmission Circuit, and Frequency Adjustment Circuit]

Figure 2:
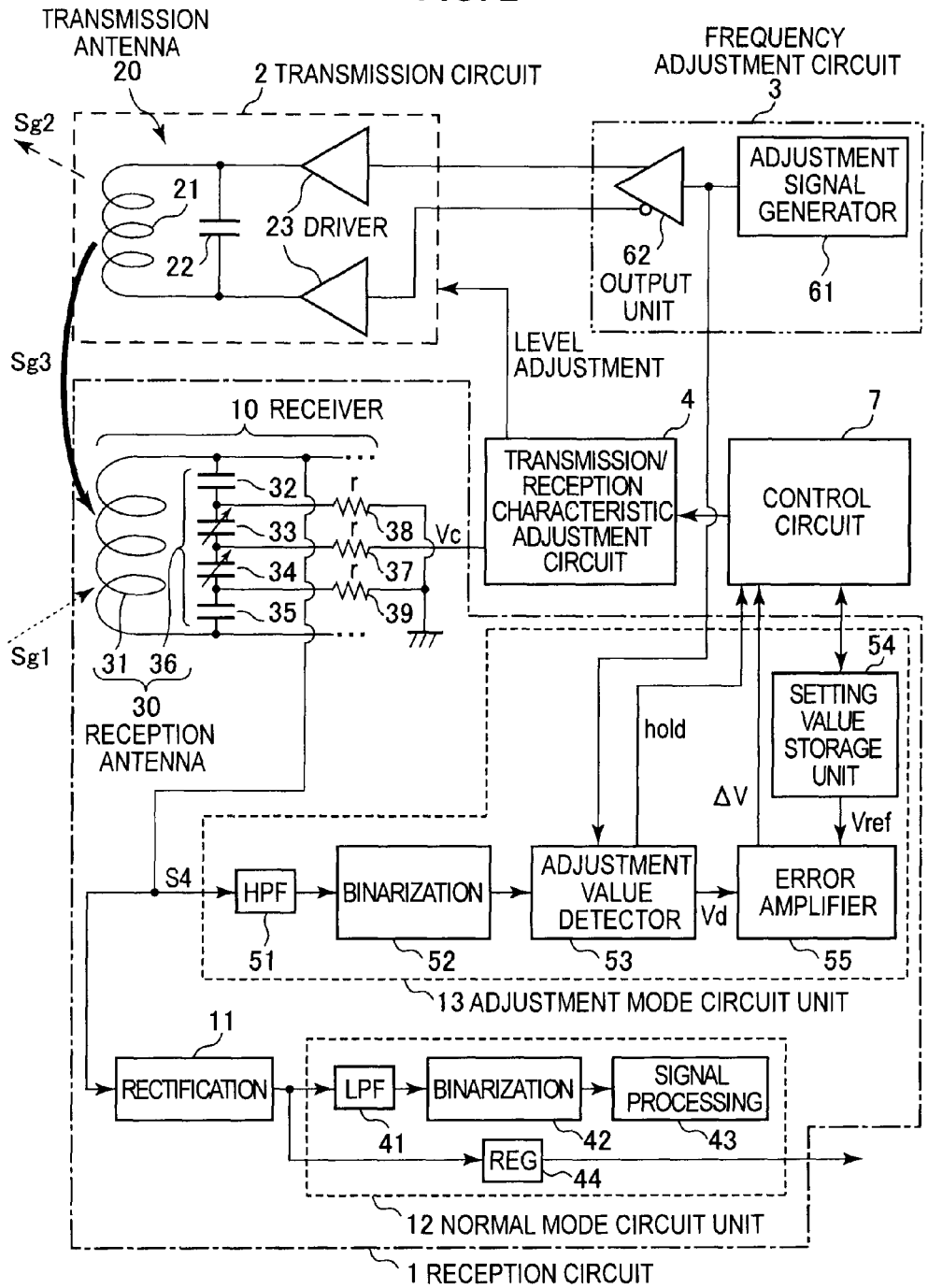
FIG. 2 is a schematic configuration diagram illustrating a reception circuit and a transmission circuit in the non-contact communication unit of the first embodiment.

The internal configurations of the reception circuit 1, the transmission circuit 2, and the frequency adjustment circuit 3 of the first embodiment will be described below with reference to FIG. 2. FIG. 2 is a schematic configuration diagram illustrating the reception circuit 1 and the transmission circuit 2 of the first embodiment. FIG. 2 also illustrates a connection relationship among the reception circuit 1 and the transmission circuit 2, the frequency adjustment circuit 3, the transmission/reception characteristic adjustment circuit 4, and the control circuit 7.

The internal configuration of the reception circuit 1 will be described. The reception circuit 1 includes a receiver 10, a rectifier circuit 11, a normal mode circuit unit 12, an adjustment mode circuit unit 13 (an adjustment signal detection circuit).

The receiver 10 includes a resonance coil 31, two variable-capacitance capacitors 33 and 34 (first and second variable-capacitance capacitors), and two constant-capacitance capacitors 32 and 35 (first and second constant-capacitance capacitors). The receiver 10 also includes three current-limiting resistors 37 to 39 (a first current-limiting resistor to a third current-limiting resistor).

The first variable-capacitance capacitor 33 and the second variable-capacitance capacitor 34 are electrostatic capacitance elements in which a capacitance changes according to a control voltage Vc applied from the control circuit 7 through the transmission/reception characteristic adjustment circuit 4. In the first embodiment, a variable-capacitance capacitor in which the capacitance decreases with increasing control voltage Vc is used as each of the first variable-capacitance capacitor 33 and the second variable-capacitance capacitor 34.

On the other hand, the first constant-capacitance capacitor 32 and the second constant-capacitance capacitor 35 are electrostatic capacitance elements in which the capacitance hardly changes irrespective of a type (a direct current or an alternating current) of the input signal and the signal level of the input signal. The first constant-capacitance capacitor 32 and the second constant-capacitance capacitor 35 act as bias removing capacitors that suppress an influence of interference of a control current input from the side of the control circuit 7 and a received-signal current.

In the first embodiment, the first constant-capacitance capacitor 32, the first variable-capacitance capacitor 33, the second variable-capacitance capacitor 34, and the second constant-capacitance capacitor 35 are connected in series in this order to constitute one resonance capacitor 36. The resonance capacitor 36 including the group of series-connected capacitors and the resonance coil 31 are connected in parallel to constitute a resonant circuit, namely, a reception antenna 30. In the first embodiment, the transmission signal Sg1 or the resonant frequency adjusting adjustment signal Sg3 is received from the external R/W device or the transmission circuit 2 by electromagnetic induction of the resonant circuit.

The first current-limiting resistor 37 to the third current-limiting resistor 39 suppress the influence of the interference of the control current input from the side of the control circuit 7 and the received-signal current. One of terminals of the first current-limiting resistor 37 is connected to connection portion between the first variable-capacitance capacitor 33 and the second variable-capacitance capacitor 34, and the other terminal is connected to the output terminal of the transmission/reception characteristic adjustment circuit 4. That is, in the first embodiment, the control voltage Vc controlling the capacitances of the first variable-capacitance capacitor 33 and the second variable-capacitance capacitor is applied from the control circuit 7 through the transmission/reception characteristic adjustment circuit 4 and the first current-limiting resistor 37. One of terminals of the second current-limiting resistor 38 is connected to a connection portion between the first constant-capacitance capacitor 32 and the first variable-capacitance capacitor 33, and the other terminal is grounded. One of terminals of the third current-limiting resistor 39 is connected to a connection portion between the second variable-capacitance capacitor 34 and the second constant-capacitance capacitor 35, and the other terminal is grounded.

Although not illustrated, the rectifier circuit 11 is constructed by a half-wave rectifier circuit including a rectifying diode and a rectifying capacitor. The rectifier circuit 11 rectifies an AC voltage received by the reception antenna 30 into a DC voltage, and outputs the DC voltage.

The normal mode circuit unit 12 is a circuit unit that functions in performing the normal operation of the IC card function. The normal mode circuit unit 12 includes a lowpass filter circuit 41, a binarization processor 42, a signal processor 43, and a power regulator 44.

The lowpass filter circuit 41, the binarization processor 42, and the signal processor 43 are connected to the output terminal of the rectifier circuit 11 in this order. The circuit group including the lowpass filter circuit 41, the binarization processor 42, and the signal processor 43 constitutes a demodulation circuit, and demodulates the transmission signal received from the external device by the reception antenna 30. The power regulator 44 accumulates and stabilizes a driving power of the reception circuit 1, and supplies the electric power to predetermined each unit.

The adjustment mode circuit unit 13 is a circuit unit that functions in adjusting the resonant frequency of the reception antenna 30 (in the adjustment mode). The adjustment mode circuit unit 13 mainly includes a highpass filter circuit 51, a binarization processor 52, an adjustment value detector 53, a setting value storage unit 54 (the target value storage unit), and an error amplifier 55. As described later, in the adjustment mode of the first embodiment, a deviation of the resonant frequency is adjusted based on a phase difference between the adjustment signal Sg3 (the carrier) and the received signal, a voltage ratio between the adjustment signal Sg3 and the received signal, or an amplitude value (a voltage level) of the adjustment signal Sg3.

The highpass filter circuit 51 is connected to the reception antenna 30, and extracts a voltage signal (a received voltage) corresponding to a carrier component of the adjustment signal Sg3 received by the reception antenna 30. The output terminal of the highpass filter circuit 51 is connected to the binarization processor 52, and outputs the voltage signal of the extracted carrier component to the binarization processor 52.

The binarization processor 52 performs binarization processing to the voltage signal extracted by the highpass filter circuit 51. As a result, a rectangular-wave signal of the carrier component is output from the binarization processor 52. Thus, the amplitude of the voltage signal of the demodulated carrier component can be kept constant by performing the binarization processing to the voltage signal extracted by the highpass filter circuit 51. The output terminal of the binarization processor 52 is connected to the adjustment value detector 53, and the binarization processor 52 output the binarized voltage signal of the carrier component to the adjustment value detector 53.

The adjustment value detector 53 calculates adjustment parameters (adjustment values) used to correct the deviation of the resonant frequency. In the first embodiment, the adjustment value detector 53 calculates the adjustment parameters including information on a transmission state (for example, a transmission voltage or a phase) of the adjustment signal Sg3. Specifically, the adjustment value detector 53 calculates a phase difference φ between the adjustment signal Sg3 and a received signal of the adjustment signal Sg3, a voltage ratio VR between the adjustment signal Sg3 and the received signal of the adjustment signal Sg3, or an amplitude value (a transmission voltage Vt) of the adjustment signal Sg3.

The two input terminals of the adjustment value detector 53 are connected to the binarization processor 52 and an adjustment signal generator 61 of the frequency adjustment circuit 3. The received signal (the voltage signal) of the adjustment signal Sg3 is input to one of the input terminals of the adjustment value detector 53 from the binarization processor 52, and the adjustment signal Sg3 is input to the other input terminal from the adjustment signal generator 61. The adjustment value detector 53 calculates the adjustment parameters based on the input adjustment signal Sg3 and the received signal of the adjustment signal Sg3.

The output terminal of the adjustment value detector 53 is connected to the error amplifier 55, and the calculated adjustment parameters are output to the error amplifier 55. The adjustment value detector 53 is also connected to the control circuit 7, and the adjustment value detector 53 outputs a hold signal to the control circuit 7 when the resonant frequency is adjusted to a desired resonant frequency. The hold signal indicates that the control voltage Vc currently applied to the reception antenna 30 is maintained (that the adjustment mode is ended).

Optimum values (target values) of the adjustment parameters calculated by the adjustment value detector 53 are stored in the setting value storage unit 54. Suitable adjustment allowable ranges of the adjustment parameters are also stored in the setting value storage unit 54. That is, pieces of information on suitable adjustment ranges of the adjustment parameters are stored in the setting value storage unit 54.

For example, the target values of the adjustment parameters are properly set depending on the intended use. Specifically, for example, the target values of the voltage ratio VR, the phase difference $\phi$, and the transmission voltage Vt vary according to a distance between the reception antenna 30 and the transmission antenna 20 and a size of each antenna. That is, the target values of the adjustment parameters change according to the configuration of the transmission/reception system of the target mobile communication terminal. Therefore, in the first embodiment, for example, the target value of the adjustment parameters are previously measured in each type of the mobile communication terminal, and measurement results are stored in the setting value storage unit 54. For example, the adjustment allowable range of the adjustment parameters is properly set according to a necessary adjustment accuracy of the resonant frequency.

The error amplifier 55 compares one of the adjustment parameters input from the adjustment value detector 53 to the corresponding target value stored in the setting value storage unit 54, and determines whether the resonant frequency (the received resonant frequency) of the reception antenna 30 needs to be adjusted. When the resonant frequency of the reception antenna 30 needs to be adjusted, namely, when the adjustment parameter value input from the adjustment value detector 53 does not fall within the predetermined target range, the error amplifier 55 generates an error signal $\Delta V$.

The error amplifier 55 is connected to the control circuit 7, and outputs the generated error signal $\Delta V$ to the control circuit 7. Based on the error signal $\Delta V$ input from the error amplifier 55, the control circuit 7 controls the transmission/reception characteristic adjustment circuit 4 to increase or decrease the control voltage Vc, thereby adjusting the resonant frequency of the reception antenna 30.

The internal configuration of the transmission circuit 2 will briefly be described below. The transmission circuit 2 includes a transmission antenna 20 and two drivers 23 that output predetermined transmission signals to the transmission antenna 20. In the first embodiment, because only the resonant frequency of the reception circuit 1 is adjusted, the transmission antenna 20 is constructed by a resonance coil 21 and a constant-capacitance resonance capacitor 22, and the resonance coil 21 and the resonance capacitor 22 are connected in parallel.

The internal configuration of the frequency adjustment circuit 3 will briefly be described below. The frequency adjustment circuit 3 includes the adjustment signal generator 61 and an adjustment signal output unit 62.

The adjustment signal generator 61 generates the adjustment signal Sg3 having a predetermined frequency (a carrier frequency), which is transmitted from the transmission circuit 2 to the reception circuit 1 in the resonant frequency adjustment mode. The output terminal of the adjustment signal generator 61 is connected to the adjustment signal output unit 62 and the adjustment value detector 53 of the reception circuit 1, and the adjustment signal generator 61 outputs the generated adjustment signal Sg3 to the adjustment signal output unit 62 and the adjustment value detector 53.

The adjustment signal output unit 62 generates a normal-phase signal and a reversed-phase signal of the adjustment signal Sg3 input from the adjustment signal generator 61, and adjust an amplitude level of each signal to a predetermined amplitude level. The adjustment signal output unit 62 includes two output terminals, outputs the normal-phase adjustment signal Sg3 from one of the output terminals, and outputs the reversed-phase adjustment signal Sg3 from other output terminal. The two output terminals of the adjustment signal output unit 62 are connected to the two drivers 23 of the transmission circuit 2, respectively. The adjustment signal output unit 62 outputs the normal-phase adjustment signal Sg3 to one of the drivers 23 and outputs the reversed-phase adjustment signal Sg3 to the other driver 23.

[Resonant Frequency Adjustment Principle]

A resonant frequency adjustment principle (a principle of correction for the deviation of the received resonant frequency) of the reception circuit 1 of the non-contact communication unit 100 in the mobile communication terminal of the first embodiment will be described with reference to the drawings.

As described above, in the first embodiment, the resonant frequency of the reception circuit 1 is adjusted based on the phase difference $\phi$ between the adjustment signal Sg3 output from the adjustment value detector 53 and the received signal of the adjustment signal Sg3, the voltage ratio VR between the adjustment signal Sg3 and the received signal of the adjustment signal Sg3, and the transmission voltage Vt of the adjustment signal Sg3. That the received resonant frequency can be adjusted to the optimum value using one of the adjustment parameters will be described below based on verification experiments performed by the inventors.

Figure 3:
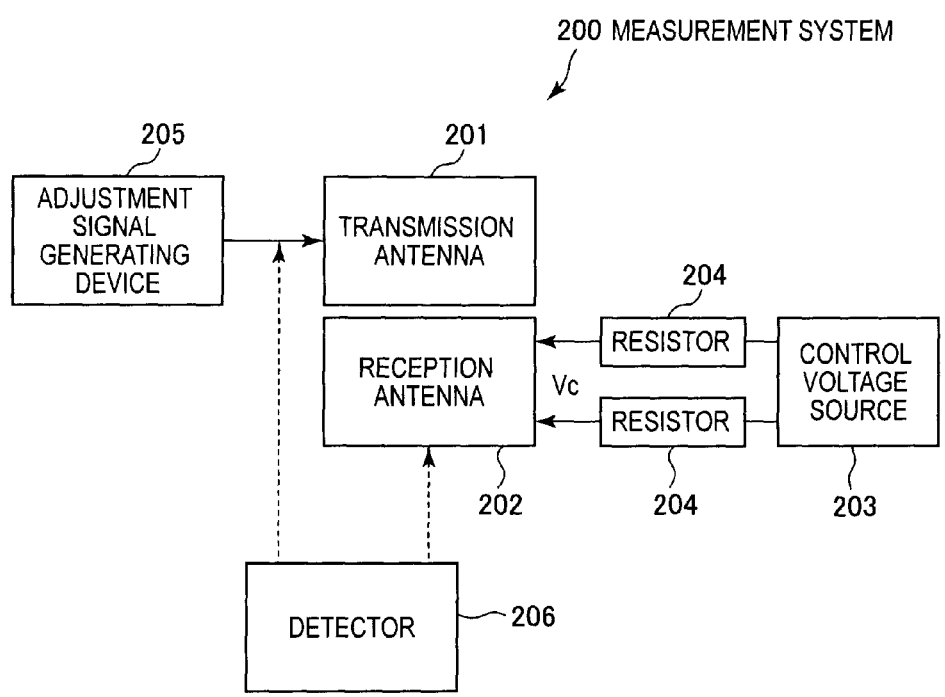
FIG. 3 is a block configuration diagram of a measurement system used in a verification experiment.

A verification experiment system is considered as illustrated in FIG. 3 FIG. 3 is a block configuration diagram of a measurement system that was used in the verification experiments performed by the inventors. A measurement system 200 for the verification experiment includes a transmission antenna 201, a reception antenna 202, a control voltage source 203, resistors 204, an adjustment signal generating device 205, and a detector 206. The transmission antenna 201 and the reception antenna 202 are electromagnetically coupled.

Although not illustrated in FIG. 3, the transmission antenna 201 and the reception antenna 202 have the same configurations as the transmission antenna 20 and reception antenna 30 of the first embodiment. The resistors 204 are provided between the control voltage source 203 and the reception antenna 202 in order to remove interference of the output signal from the control voltage source 203 and the signal received by the reception antenna 202, and 1-M$\Omega$ resistors are used as the resistors 204.

In the measurement system 200 in FIG. 3, a voltage waveform of the transmission signal (corresponding to the adjustment signal) applied to the transmission antenna 201 and a voltage waveform of the received signal received by the reception antenna 202 are observed with an oscilloscope as the detector 206.

The measurement system 200 in FIG. 3 is designed such that the resonant frequency becomes 13.3 MHz when the control voltage Vc of 0 V is applied to a variable resonance capacitor of the reception antenna 202. The measurement system 200 in FIG. 3 is designed such that the resonant frequency becomes 13.56 MHz at the control voltage Vc of 2.2 V.

However, in the configuration of the measurement system 200, capacitances (about 10 pF) of the control voltage source 203 (a DC power supply) and a measuring probe of the detector 206 are connected in parallel with the resonant circuit of the reception antenna 202, and the capacitances have an influence on the resonant frequency. In the measurement system 200, there is also an influence of magnetic coupling of the transmission antenna 201 and the reception antenna 202. Actually the resonant frequency of the measurement system 200 in FIG. 3 is degraded lower than the design value by the influences, and the resonant frequency became 11.15 MHz at the control voltage Vc of 0 V.

The following verification experiments were performed with the measurement system 200. At this point, in the following verification experiments, the transmission antenna 201 and the reception antenna 202 were fixed to positions where the received voltage become the maximum.

(1) Verification Experiment 1

Figure 4:
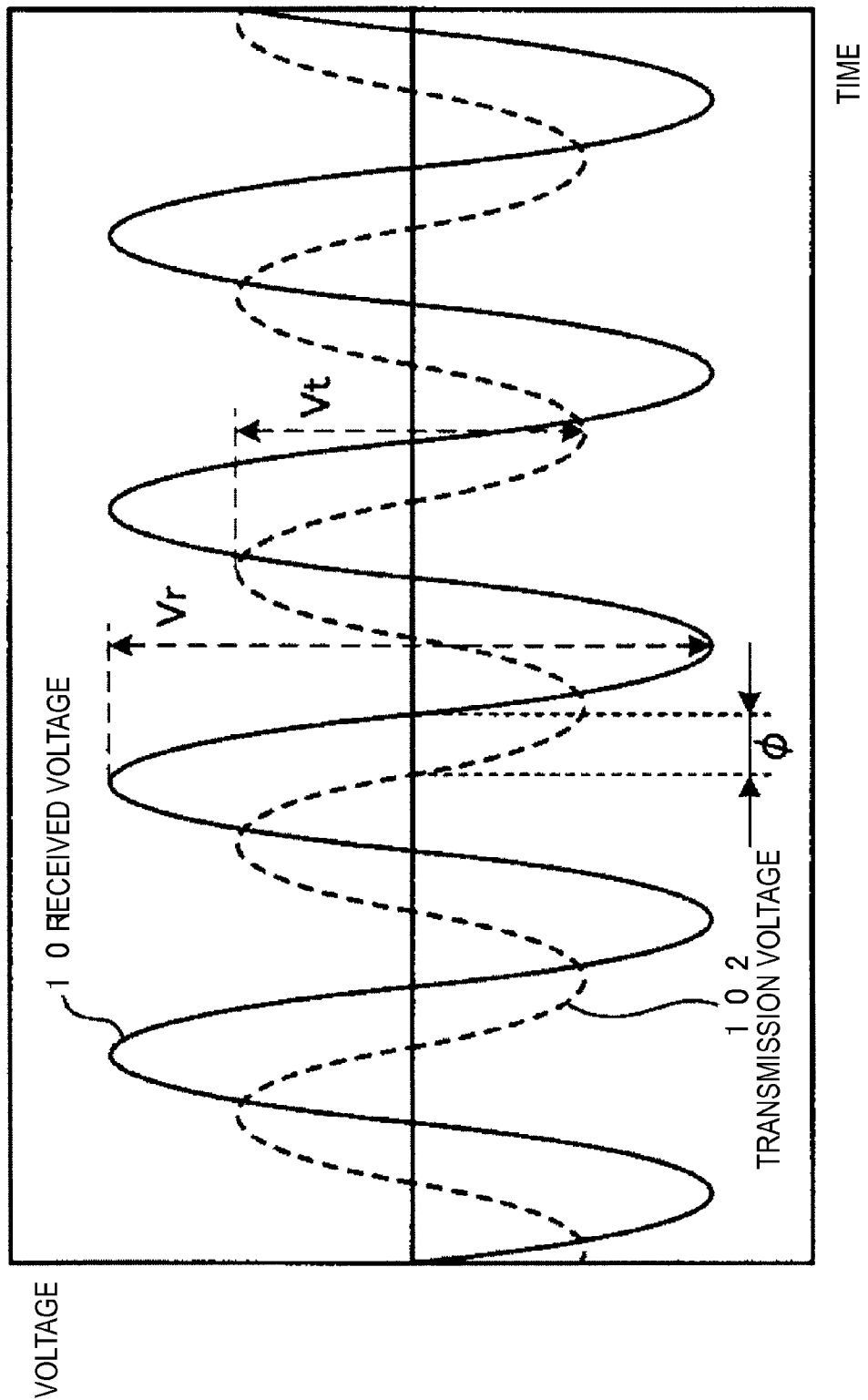
FIG. 4 is a waveform chart illustrating a received voltage and a transmission voltage, which are measured in the verification experiment.

In the measurement system 200, waveforms in FIG. 4 are observed when the voltage waveform of the transmission signal having a predetermined carrier frequency applied to the transmission antenna 201 and the voltage waveform of the received signal received by the reception antenna 202 are observed with the detector 206. As to characteristics in FIG. 4, a horizontal axis indicates time and a vertical axis indicates a voltage level. In FIG. 4, a characteristic 101 expresses the voltage waveform of the received signal, and a characteristic 102 express the voltage waveform of the transmission signal.

In a verification experiment 1, a received voltage Vr, a transmission voltage Vt, and the phase difference φ between the received signal and the transmission signal are calculated from the voltage waveforms in FIG. 4. The calculation processing was repeatedly performed while the carrier frequency of the transmission signal was changed, and a relationship among the carrier frequency, the received voltage Vr, the transmission voltage Vt, and the phase difference φ between the received signal and the transmission signal were investigated. As used herein, the received voltage Vr and the transmission voltage Vt mean peak-to-peak values of the voltage waveforms (sinusoidal waves) (see FIG. 4).

In the measurement system 200, as described above, the transmission antenna 201 and the reception antenna 202 are electromagnetically coupled. Therefore, when the received voltage Vr changes according to the carrier frequency, because an impedance on the reception side changes from the view of the carrier frequency transmission side, the transmission voltage Vt of the transmission signal also varies according to the carrier frequency.

Figure 5:
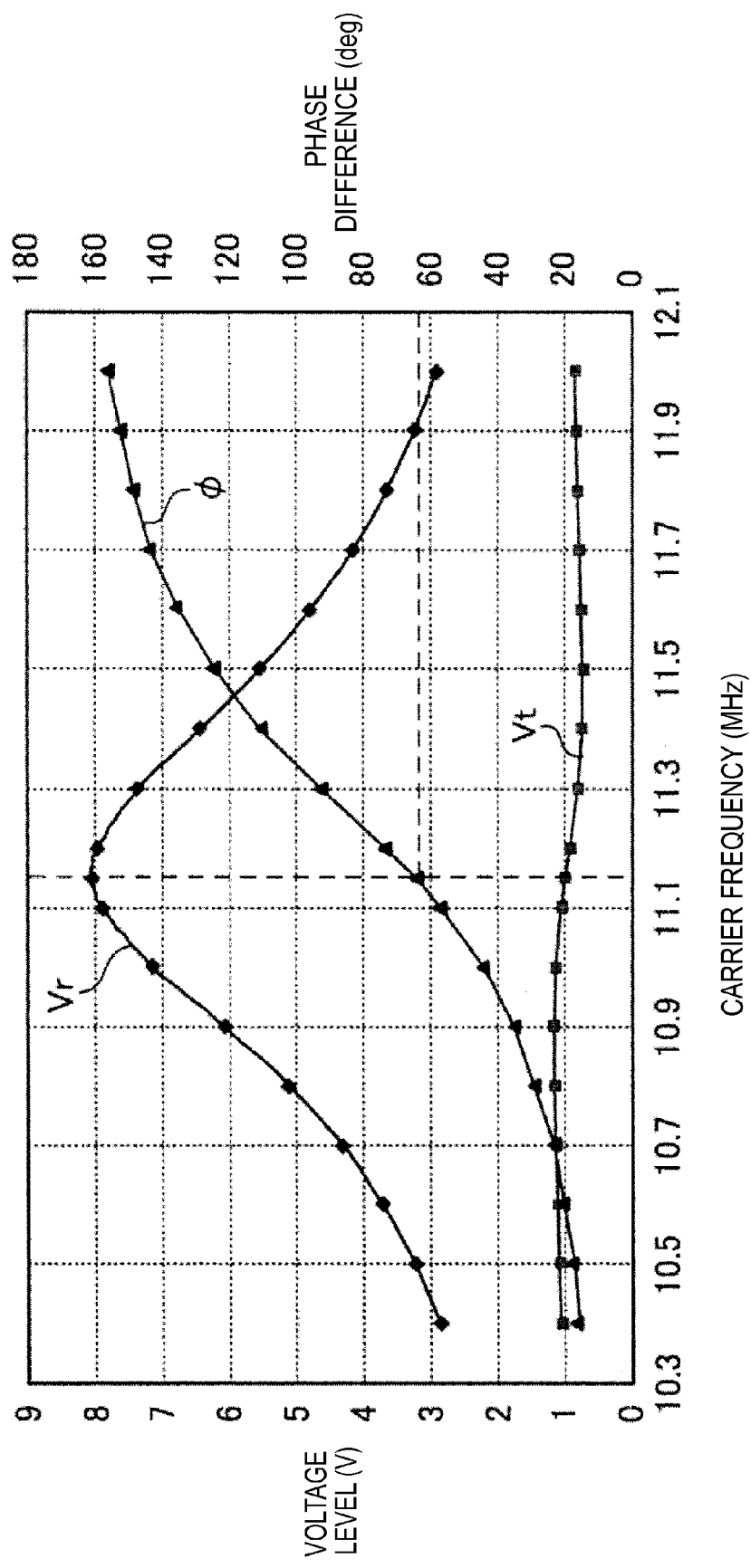
FIG. 5 is a view illustrating a result of a verification experiment 1.

FIG. 5 illustrates a result of the verification experiment 1 when the control voltage Vc of 0 V is applied to the reception antenna 202. In characteristics in FIG. 5, the horizontal axis indicates the carrier frequency and the vertical axis indicates the voltage level (the received voltage Vr or the transmission voltage Vt) and the phase difference φ.

As is clear from the result in FIG. 5, the received voltage Vr increases with increasing carrier frequency (transmission frequency) of the transmission signal, and becomes the maximum at about 11.15 MHz. Then the received voltage Vr decreases when the carrier frequency further increases.

On the other hand, the transmission voltage Vt increases with increasing carrier frequency, and becomes the maximum at about 10.9 MHz When the carrier frequency further increases, the transmission voltage Vt decreases and becomes the minimum at about 11.5 MHz. Then, the transmission voltage Vt increases again when the carrier frequency further increases.

The phase difference φ between the received signal and the transmission signal increases monotonously with increasing carrier frequency. The phase difference φ between the received signal and the transmission signal was about 64 degrees at the carrier frequency (=about 11.15 MHz: received resonant frequency) at which the received voltage Vr became the maximum. Although not illustrated in FIG. 5, in the verification experiment 1, the voltage ratio VR (=Vr/Vt) between the received voltage Vr and the transmission voltage Vt became the maximum at the frequency that was higher by 150 kHz than the carrier frequency (about 11.15 MHz), at which the received voltage Vr became the maximum, namely, the frequency of about 11.3 MHz.

(2) Verification Experiment 2

A verification experiment 2 will be described below. As described in the verification experiment 1, in the measurement system 200 in FIG. 3, for the control voltage Vc of 0 V, the received voltage Vt becomes the maximum at the carrier frequency of about 11.15 MHz. That is, in the measurement system 200, when the control voltage Vc is set to 0 V, the reception antenna 202 has the resonant frequency of about 11.15 MHz.

In the verification experiment 2, resonance conditions of the reception antenna 202 are fixed to the control voltage Vc of 0 V and the resonant frequency of 11.15 MHz, and the output voltage level of the transmission signal applied to the transmission antenna 201 is changed to investigate an influence thereof.

Specifically, under the conditions of the control voltage Vc of 0 V and the resonant frequency of 11.15 MHz, changes in various parameters of the received signal and the transmission signal were investigated when the output voltage level of the adjustment signal generating device 205 is changed in the range of 0.5 V to 6.0 V in terms of peak-to-peak value. At this point, the received voltage Vr, the transmission voltage Vt, the voltage ratio VR (=Vr/Vt) between the received voltage Vr and the transmission voltage Vt, and the phase difference φ between the received signal and the transmission signal were calculated as the parameters.

Figure 6:
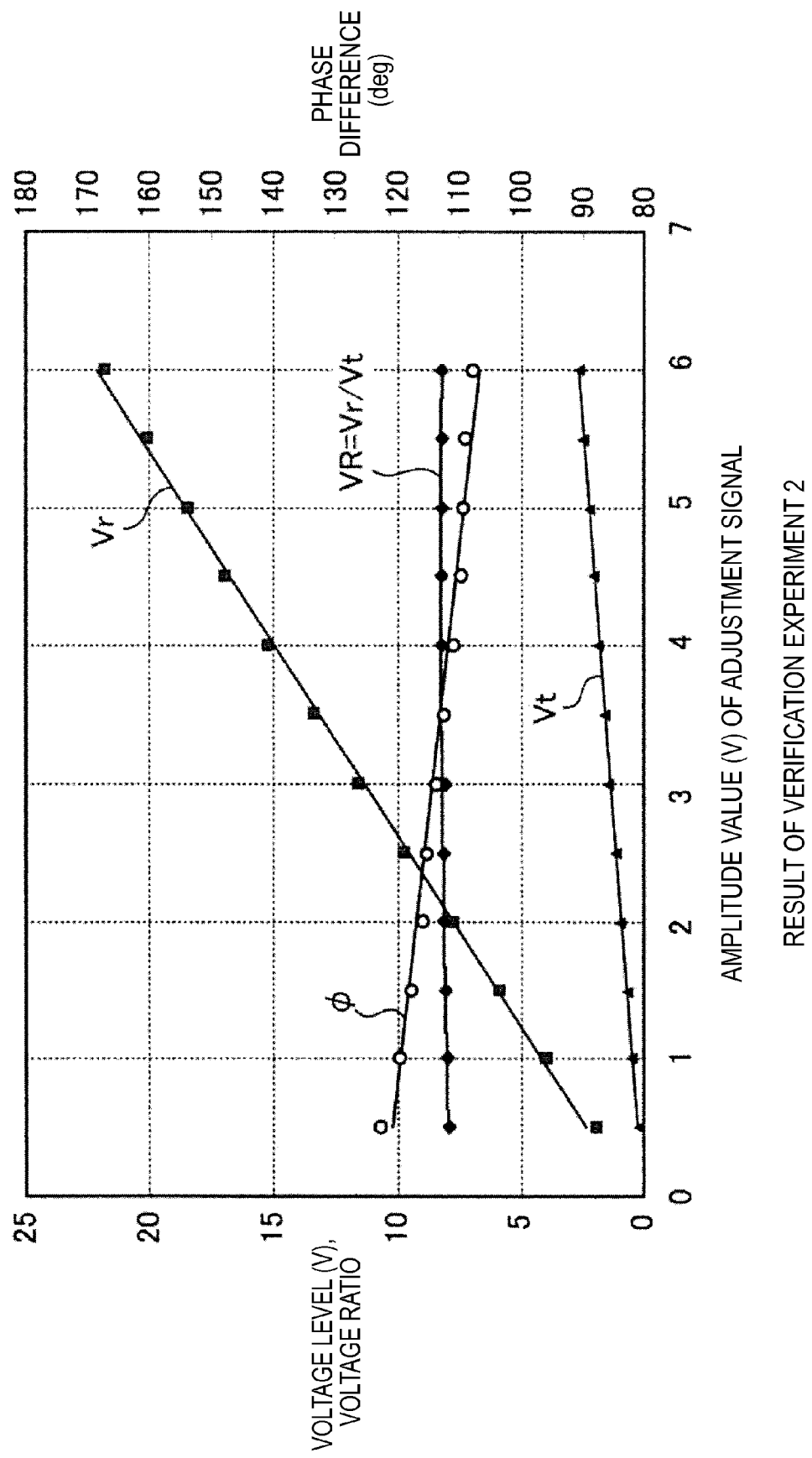
FIG. 6 is a view illustrating a result of a verification experiment 2.

FIG. 6 illustrates a result of the verification experiment 2. In characteristics in FIG. 6, the horizontal axis indicates the output voltage level of the adjustment signal generating device 205 and the vertical axis indicates the voltage level (the received voltage Vr or the transmission voltage Vt), the voltage ratio VR, and the phase difference φ.

As is clear from FIG. 6, both the received voltage Vr and the transmission voltage Vt increase monotonously with increasing output voltage level of the adjustment signal generating device 205. On the other hand, amounts of change of the phase difference φ and the voltage ratio VR are extremely small with respect to the change in output voltage level of the adjustment signal generating device 205. That is, it is found that the phase difference φ and the voltage ratio VR are hardly influenced by the change in output voltage level of the adjustment signal generating device 205. This is attributed to the following reasons.

As to the phase difference φ, because the received signal is obtained by the resonance, the received signal has an extremely small deformation, and the phase of the received signal hardly changes even if the output voltage level of the adjustment signal generating device 205 changes. On the other hand, as to the voltage ratio VR, because both the received voltage Vr and the transmission voltage Vt increase monotonously with respect to the output voltage level of the adjustment signal generating device 205, the amount of the change in each voltage is canceled by obtaining the ratio (the voltage ratio VR) of the received voltage Vr and the transmission voltage Vt.

It is found from the verification experiments 1 and 2 that the voltage ratio VR (=Vr/Vt) between the received voltage Vr and the transmission voltage Vt and the phase difference φ between the received signal and the transmission signal hardly depend on the amplitude variation of the transmission signal (the adjustment signal) output from the adjustment signal generating device 205. That is, the voltage ratio VR and the phase difference φ are hardly influenced by the variations in received voltage Vr and transmission voltage Vt. Therefore, in the first embodiment, the received resonant frequency can be adjusted irrespective of the variations in received voltage Vr and transmission voltage Vt of the adjustment signal Sg3 (the transmission signal) in the case that the voltage ratio VR or the phase difference φ is used as the adjustment parameter used in adjusting the received resonant frequency.

(3) Verification Experiment 3

In a verification experiment 3, the carrier frequency was shifted from 11.15 MHz used in the verification experiments 1 and 2 to the resonant frequency (in this case, 11.3 MHz) that should be adjusted, and the transmission signal was output from the adjustment signal generating device 205. On the reception side, the control voltage Vc applied to the variable capacitor of the reception antenna 202 was changed in the range of 0 to 3V to measure the parameters of the received signal and transmission signal.

Figure 7:
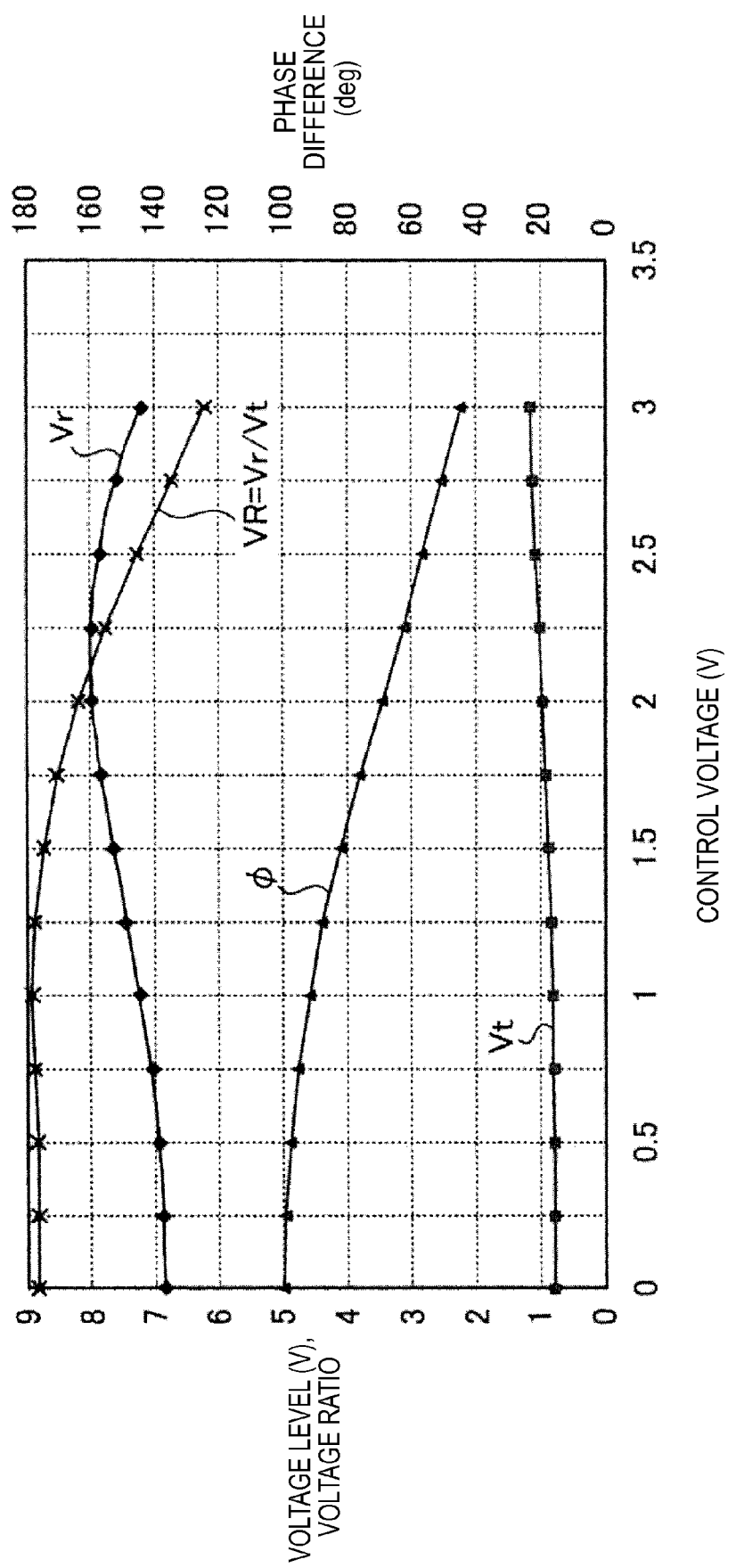
FIG. 7 is a view illustrating a result 1 of a verification experiment 3.

FIG. 7 illustrates a result of the verification experiment 3. In characteristics in FIG. 7, the horizontal axis indicates the control voltage Vc and the vertical axis indicates the voltage level (the received voltage Vr or the transmission voltage Vt), the voltage ratio VR, and the phase difference φ.

As is clear from FIG. 7, the received voltage Vr becomes the maximum at a predetermined control voltage Vc. On the other hand, the transmission voltage Vt increases monotonously with increasing control voltage Vc. The phase difference φ decreases monotonously with increasing control voltage Vc. The voltage ratio VR decreased monotonously around the control voltage Vc at which the received voltage Vr became the maximum (around the received resonant frequency), while the voltage ratio VR became substantially flat in a region of the low control voltage Vc (a region where the resonant frequency was largely deviated).

In the measurement system 200, it is found from the result in FIG. 7 that the control voltage Vc needs to be set to 2.25 V in order to set the resonant frequency of the reception antenna 202 to 11.3 MHz. At this point, the transmission voltage Vt was 1.03 V, the phase difference φ was 64 degrees, and the voltage ratio VR was 7.78.

As is clear from the results of the verification experiments 1 and 3, it is found that, even if the carrier frequency is changed in the measurement system 200, the phase difference φ (=64 degrees) is kept constant when the received voltage Vr becomes the maximum (when the resonant frequency of the reception antenna 202 becomes the desired value)

Figure 8:
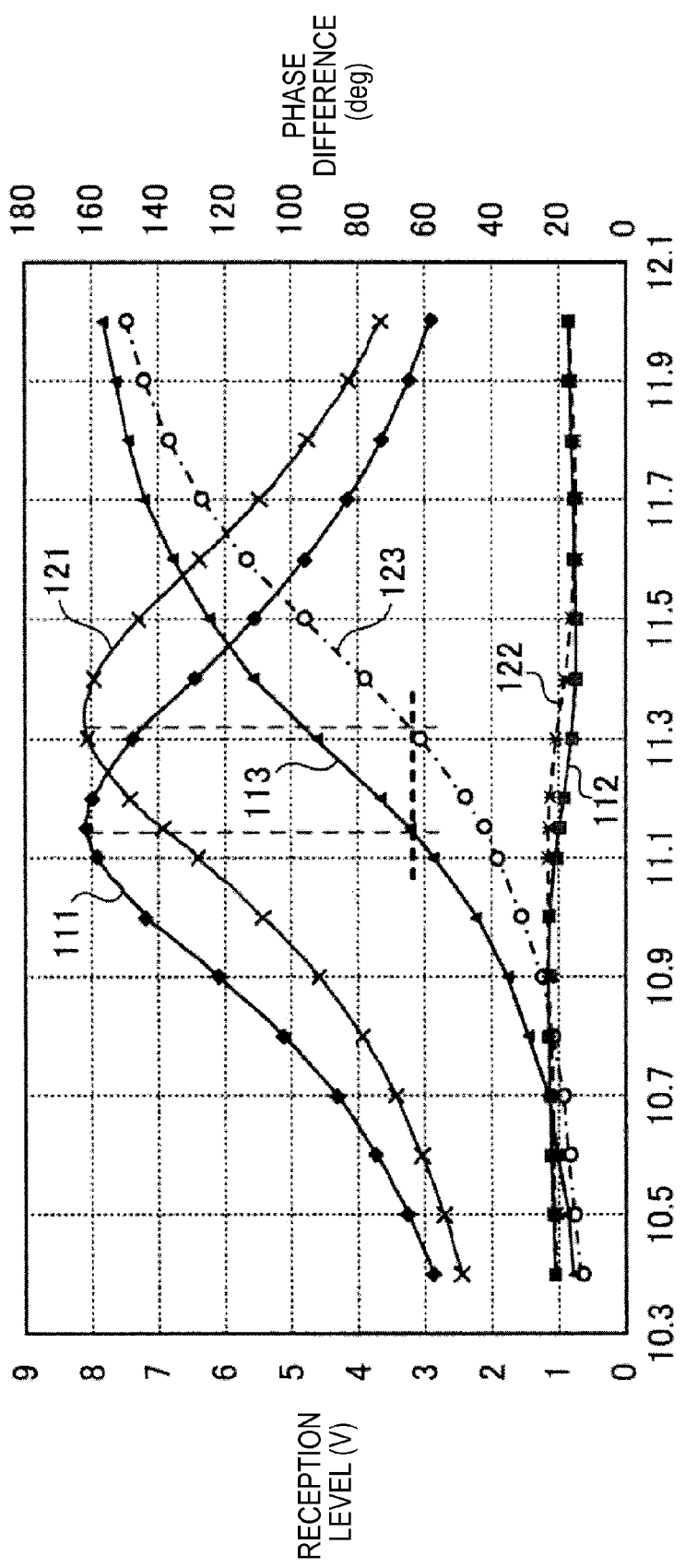
FIG. 8 is a view illustrating a result 2 of the verification experiment 3.

FIG. 8 more specifically illustrates the result. In characteristics in FIG. 8, the horizontal axis indicates the carrier frequency (the transmission frequency) and the vertical axis indicates the voltage level (the received voltage Vr or the transmission voltage Vt) and the phase difference . In FIG. 8, a characteristic 111 expresses the change in received voltage Vr for the control voltage Vc of 0 V, and a characteristic 121 expresses the change in received voltage Vr for the control voltage Vc of 2.25 V. In FIG. 8, a characteristic 112 expresses the change in transmission voltage Vt for the control voltage Vc of 0 V, and a characteristic 122 expresses the change in transmission voltage Vt for the control voltage Vc of 2.25 V. In FIG. 8, a characteristic 113 expresses the change in phase difference φ for the control voltage Vc of 0 V, and a characteristic 123 expresses the change in phase difference φ for the control voltage Vc of 2.25 V.

As is clear from the result in FIG. 8, irrespective of the control voltage Vc, the phase difference φ between the received signal and the transmission signal is substantially kept constant when the received voltage Vr becomes the maximum. That is, in the same transmission/reception system, even if the carrier frequency (the received resonant frequency) is changed by changing the control voltage Vc when the received voltage Vr becomes the maximum, the phase difference φ between the received signal and the transmission signal is substantially kept constant when the received voltage Vr becomes the maximum.

Figure 9:
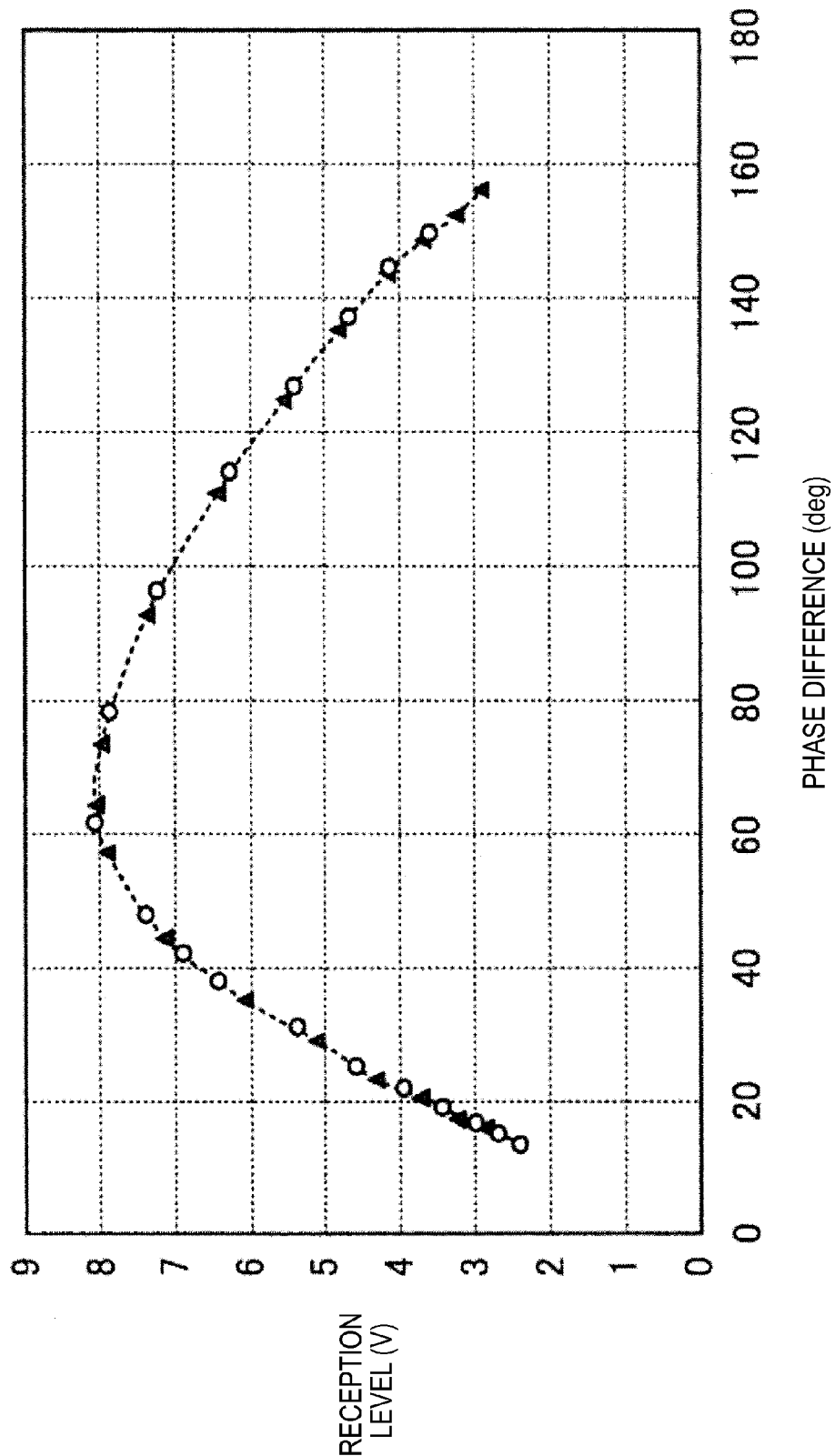
FIG. 9 is a view illustrating a result 3 of the verification experiment 3.

FIG. 9 illustrates a correlation characteristic of the phase difference φ and the received voltage Vr (a reception level). In characteristics in FIG. 9, the horizontal axis indicates the phase difference φ and the vertical axis indicates the reception level. In FIG. 9, the correlation characteristic at the control voltage Vc of 0 V is indicated by a triangle, and the correlation characteristic at the control voltage Vc of 2.25 V is indicated by a circle.

As is clear from the correlation characteristic of the phase difference φ and the received voltage Vr in FIG. 9, it is found that the correlation characteristic at the control voltage Vc of 0 V and the correlation characteristic at the control voltage Vc of 2.25 V are on the substantially same curve. As can be seen from the result in FIG. 9, the phase difference φ is independent of the control voltage Vc when received voltage Vr becomes the maximum. That is, from the verification results in FIGS. 7 to 9, it is not necessary to sweep the carrier frequency of the transmission signal in the adjustment mode when the phase difference φ is used as the adjustment parameter of the resonan.

Figure 10:
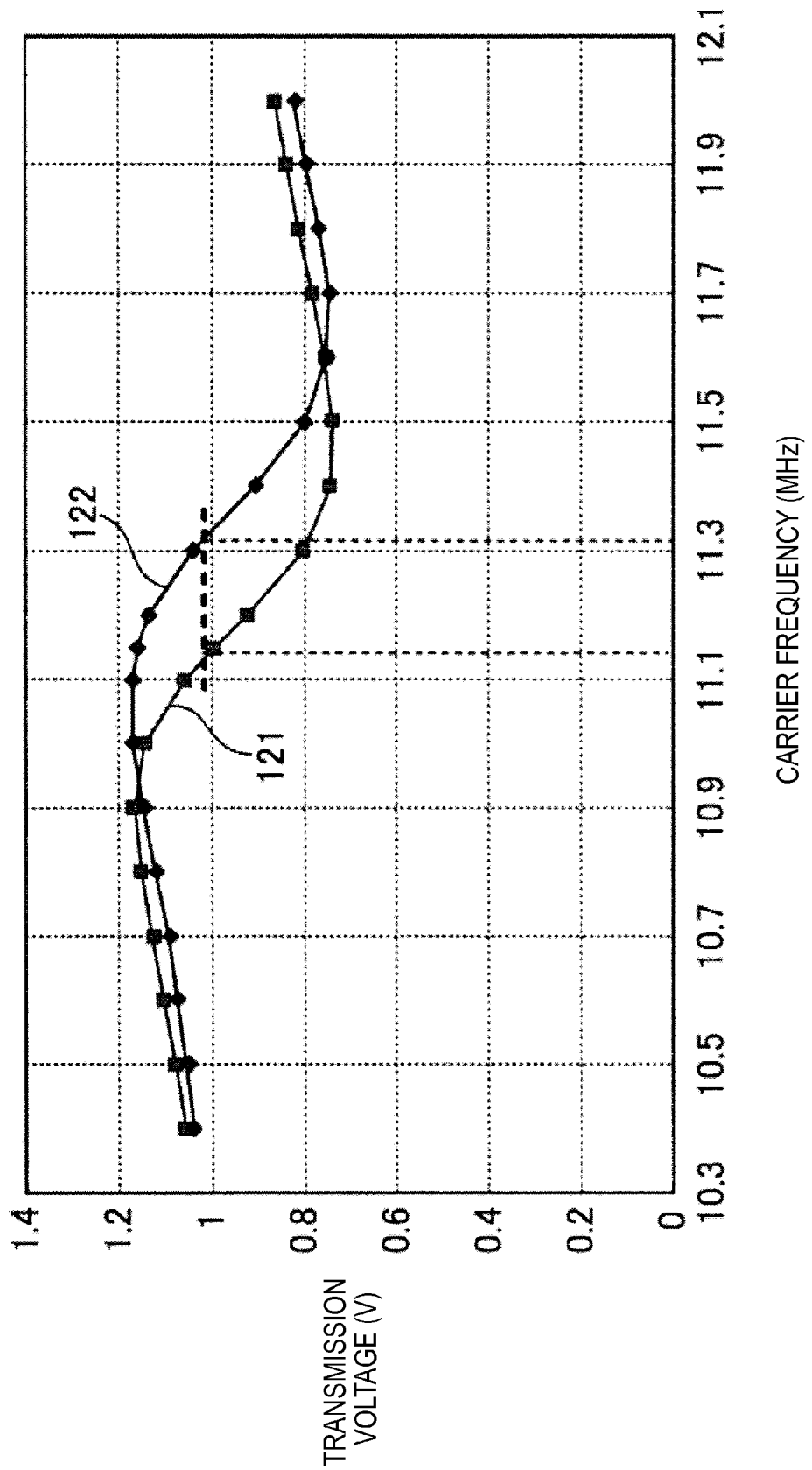
FIG. 10 is a view illustrating a result 4 of the verification experiment 3.

FIG. 10 is an enlarged view illustrating the characteristic of the transmission voltage Vt extracted from FIG. 8. As is clear from FIG. 10, it is found that the transmission voltage Vt is kept constant (about 1.03 V in an example of the transmission/reception system having the characteristic in FIG. 10) irrespective of the control voltage Vc when the received voltage Vr becomes the maximum (at the resonant frequency of the reception antenna 202).

The following can be said from the results of the verification experiments 1 to 3 in the case that the voltage ratio VR between the received signal and the transmission signal, the phase difference φ between the received signal and the transmission signal, or the transmission voltage Vt is used as the adjustment parameter when the resonant frequency of the reception antenna 30 is adjusted using the adjustment signal Sg3.

As illustrated in FIG. 6, even if the transmission voltage Vt and received voltage Vr of the adjustment signal Sg3 varies, the voltage ratio VR or the phase difference φ is substantially kept constant. Therefore, in the case that the voltage ratio VR between the received signal and the transmission signal or the phase difference φ between the received signal and the transmission signal is used as the adjustment parameter, the resonant frequency of the reception antenna 30 can be adjusted without the influence of the variations in transmission voltage Vt and received voltage Vr of the adjustment signal Sg3. In this case, the resonant frequency is hardly influenced by a change in Q value of each antenna.

In the case that the phase difference φ between the received signal and the transmission signal or the transmission voltage Vt is used as the adjustment parameter, the resonant frequency of the reception antenna 30 can be adjusted irrespective of the control voltage Vc.

Thus, in the case that the voltage ratio VR between the received signal and the transmission signal, the phase difference φ between the received signal and the transmission signal, or the transmission voltage Vt is used as the adjustment parameter, the resonant frequency of the reception antenna 30 is hardly influenced by the variations of the adjustment conditions, and the resonant frequency can accurately and easily be adjusted to the desired value.

Therefore, in the first embodiment, the voltage ratio VR between the received signal and the transmission signal, the phase difference φ between the received signal and the transmission signal, or the transmission voltage Vt (the target value) is previously measured when the resonant frequency is adjusted to the desired resonant frequency in the reception antenna 30 (when the received voltage Vr becomes the maximum). The control voltage Vc applied to the reception antenna 30 is adjusted such that the voltage ratio VR between the received signal and the transmission signal, the phase difference φ between the received signal and the transmission signal, or the transmission voltage Vt becomes each corresponding target value. In the first embodiment, the deviation of the reception antenna 30 is corrected based on the above principle.

[Resonant Frequency Adjustment Technique]

A specific processing procedure of the resonant frequency (the received resonant frequency) adjustment technique of the reception circuit 1 in the mobile communication terminal of the first embodiment will be described with reference to the drawings. When the signal is received from, for example, the external R/W device while various pieces of adjustment processing are performed in the adjustment mode, the adjustment mode is terminated to perform processing of receiving the signal from the external device. That is, in the mobile communication terminal of the first embodiment, a higher priority is given to the normal mode than the adjustment mode.

(1) Adjustment Technique 1

In an adjustment technique 1, the voltage ratio VR (=Vr/Vt) between the received voltage Vr and the transmission voltage Vt is used as the adjustment parameter for the resonant frequency of the reception circuit 1 (the reception antenna 30). The control voltage Vc is adjusted such that the voltage ratio VR becomes a predetermined target value VR0 (a setting value), thereby adjusting the received resonant frequency to the optimum value.

Specifically, in the adjustment mode, the adjustment signal Sg3 having the same carrier frequency as the desired received resonant frequency is transmitted from the transmission circuit 2 to the reception circuit 1, and the voltage ratio VR between the received voltage Vr and the transmission voltage Vt is measured. The operation is repeated while the control voltage Vc applied to the resonance capacitor 36 of the reception circuit 1 is changed, and the control voltage Vc is adjusted such that the voltage ratio VR becomes a desired value (for example, 7.78 in an example of the transmission/reception system having the characteristics in FIGS. 5 to 10).

Figure 11:
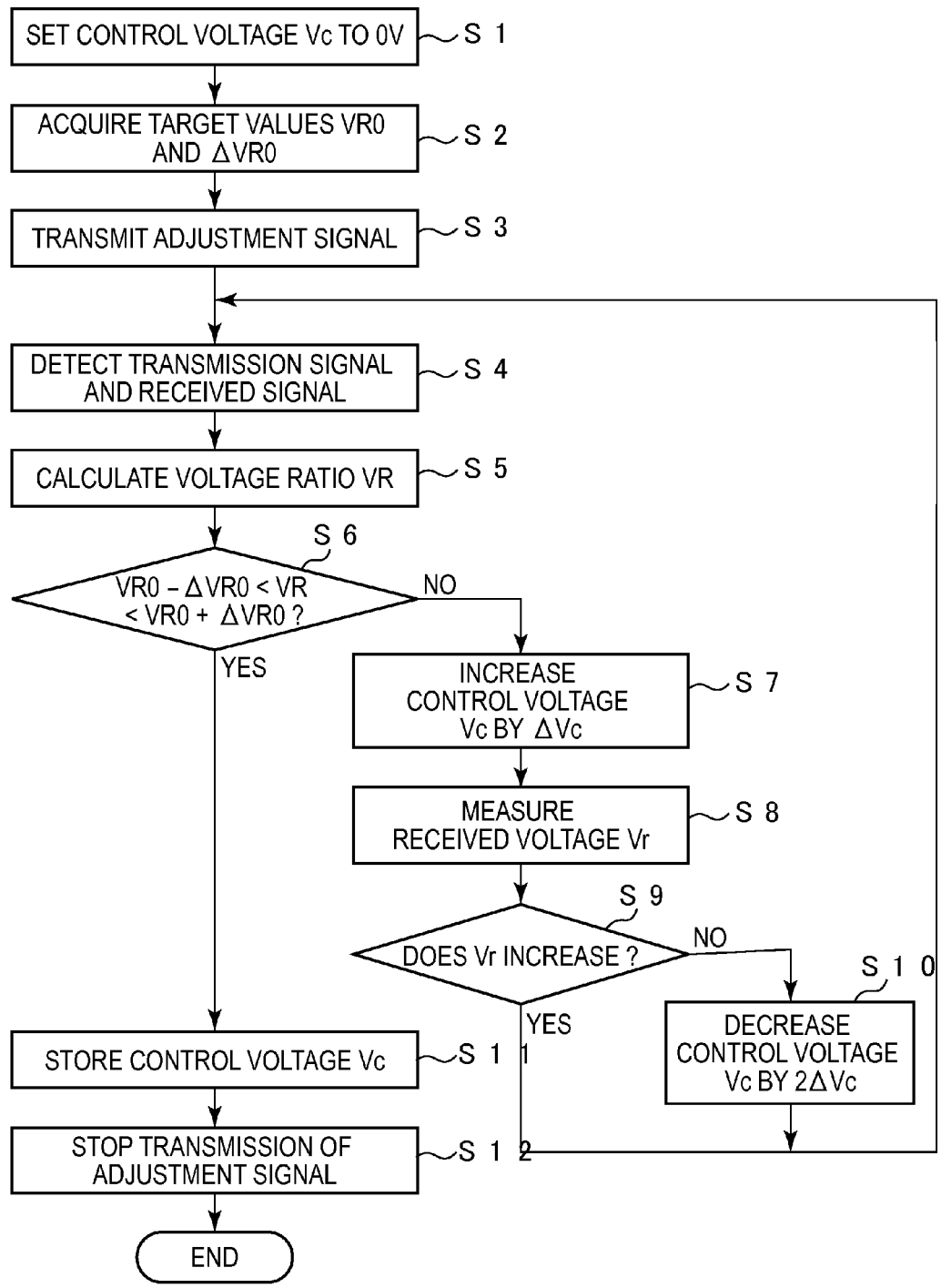
FIG. 11 is a flowchart illustrating a processing procedure of a resonant frequency adjustment technique 1 in the first embodiment.

The processing procedure of the received resonant frequency adjustment technique 1 will be described in detail with reference to FIG. 11. FIG. 11 is a flowchart illustrating the specific processing procedure of the adjustment technique 1.

The control circuit 7 sets the operating mode to the resonant frequency adjustment mode, and sets the control voltage Vc applied to the receiver 10 (the reception antenna 30) to 0 V (Step S1). At this point, the control circuit 7 decreases the Q value of the reception antenna 30 to reduce the influence of the transmission signal output from the external R/W device.

Then the error amplifier 55 acquires a target value VR0 of the voltage ratio VR and an adjustment allowable range ΔVR0 of the target value VR0 from the setting value storage unit 54 (Step S2).

The transmission circuit 2 transmits the adjustment signal Sg3 having the predetermined carrier frequency (the same frequency as the received resonant frequency) to the reception circuit 1 (Step S3). For example, the carrier frequency becomes 13.56 MHz in the case that the adjustment technique 1 is adopted in applications, such as the non-contact IC card.

Then the adjustment mode circuit unit 13 of the reception circuit 1 detects the transmission signal and received signal of the adjustment signal Sg3 (Step S4). Specifically, the adjustment value detector 53 detects the received signal of the adjustment signal Sg3 through the receiver 10 and the high-pass filter circuit 51 and binarization processor 52 of the adjustment mode circuit unit 13. The adjustment value detector 53 directly detects the transmission signal of the adjustment signal Sg3 from the adjustment signal generator 61.

The adjustment value detector 53 obtains the received voltage Vr and transmission voltage Vt (the information on the transmission state) of the adjustment signal Sg3 from the detected received signal and transmission signal of the adjustment signal Sg3 to calculate the voltage ratio VR (=Vr/Vt) between the received voltage Vr and the transmission voltage Vt (Step S5).

The error amplifier 55 compares the voltage ratio VR calculated in Step S5 to the target value VR0, and determines whether the voltage ratio VR is greater than VR0−ΔVR0 while being less than VR0+ΔVR0 (Step S6).

When the voltage ratio VR does not satisfy the determination condition (VR0−ΔVR0<VR<VR0+ΔVR0) in Step S6, a negative determination is made in Step S6. In this case, the error amplifier 55 outputs the error signal ΔV to the control circuit 7 because the resonant frequency of the reception antenna 30 is not adjusted within the desired range.

Based on the error signal ΔV, the control circuit 7 increases the control voltage Vc by ΔVc (Step S7). The increase (ΔVc) of the control voltage Vc may be set to a constant value, or changed according to a difference between the voltage ratio VR calculated in Step S7 and the target value VR0.

Then the reception circuit 1 receives the adjustment signal Sg3 while the control voltage Vc is increased, and the adjustment value detector 53 detects the received voltage Vr of the adjustment signal Sg3 (Step S8).

The control circuit 7 determines whether the received voltage Vr of the adjustment signal Sg3 detected in Step S8 increases compared with that before the increase in control voltage Vc (Step S9). Specifically, the control circuit 7 compares the received voltage Vr of the adjustment signal Sg3 detected in Step S8 to the received voltage Vr before the increase in control voltage Vc to determine whether the received voltage Vr tends to increase. The reason the determination whether the received voltage Vr of the adjustment signal Sg3 increases is made in Step S9 is as follows.

In the first embodiment, when the resonant frequency of the reception antenna 30 is not adjusted within the desired range in Step S6 (VR0−ΔVR0<VR<VR0+ΔVR0), the control voltage Vc is increased in Step S7. However, whether the processing of increasing the control voltage Vc is correct processing cannot be determined at this point. For example, as illustrated in FIG. 7, because the amount of the change in voltage ratio VR is small with respect to the control voltage Vc except the neighborhood of the target value (the resonant frequency), it is difficult to determine whether the processing of increasing the control voltage Vc in Step S7 is correct based on the change in voltage ratio VR.

Therefore, in the first embodiment, whether the processing of increasing the control voltage Vc is correct is determined in Step 9 using the received voltage Vr in which the amount of the change is relatively large with respect to the control voltage Vc.

When the control circuit 7 determines that the received voltage Vr increases in Step S9, an affirmative determination is made in Step S9. This case means that the optimum value of the control voltage Vc exists in a direction in which the control voltage Vc is increased (see FIG. 7). That is, the affirmative determination in Step S9 means that the processing of increasing the control voltage Vc in Step S7 is correct, the flow returns to Step S4 while the control voltage Vc is increased, and the pieces of processing from Step S4 are repeated.

On the other hand, when the control circuit 7 determines that the received voltage Vr does not increase in Step S9, the negative determination is made in Step S9. Because this case means that the optimum value of the control voltage Vc does not exist in the direction in which the control voltage Vc is increased, the control circuit 7 decreases the control voltage Vc by 2ΔVc (Step S10). That is, when the negative determination is made in Step S9, the control voltage Vc is decreased compared with the control voltage Vc in the calculation of the previous voltage ratio VR. Then the flow returns to Step S4, and the pieces of processing from Step S4 are repeated.

The reason the control voltage Vc is decreased by 2ΔVc in Step S10 is as follows. In the control voltage Vc is located around the optimum value (the control voltage Vc at which the received voltage Vr becomes the maximum) before the increase, the control voltage Vc return to the neighborhood of the optimum value when the control voltage Vc is decreased by ΔVc in Step S10. However, in this case, the received voltage Vr becomes a hunting state around the maximum value due to an influence of a noise and the like, and it is difficult to determine whether the control voltage Vc is the optimum value. Therefore, in the first embodiment, the control voltage Vc is decreased by 2ΔVc in Step S10 to surely decrease the control voltage Vc compared with the value before the increase, thereby solving the trouble of the hunting state.

Although the example in which the control voltage Vc is decreased by 2ΔVc in Step S10 is described in the first embodiment, the present invention is not limited to the example. When the amount of the decrease in control voltage Vc in Step S10 is less than the control voltage Vc in the calculation of the previous voltage ratio VR, and when the control voltage Vc is decreased such that the hunting state is not generated, the amount of the decrease in control voltage Vc may be set to any value.

In the adjustment technique 1, the pieces of processing in Steps S4 to S10 are repeated until the voltage ratio VR satisfies the determination condition in Step S6 (VR0−ΔVR0<VR<VR0+ΔVR0), namely, until the resonant frequency of the reception antenna 30 falls within the desired range.

When the voltage ratio VR satisfies the determination condition in Step S6, the affirmative determination is made in Step S6. In this case, because the resonant frequency of the reception antenna 30 is adjusted within the desired range, the adjustment value detector 53 outputs the hold signal indicating that the adjustment mode is ended to the control circuit 7. Based on the input hold signal, the control circuit 7 stores the current control voltage Vc in the storage unit 6 or the setting value storage unit 54 while maintaining the current control voltage Vc (Step S11). For example, the hold signal may be output from the error amplifier 55.

The transmission circuit 2 stops the transmission of the adjustment signal Sg3 (Step S12), and ends the received resonant frequency adjustment processing. In the case that the voltage ratio VR between the received voltage and the transmission voltage of the adjustment signal Sg3 is used as the adjustment parameter for the received resonant frequency, as described above, the received resonant frequency is adjusted to correct the deviation of the received resonant frequency.

(2) Adjustment Technique 2

In the adjustment technique 1, an initial value of the control voltage Vc is set to 0 V. However, the present invention is not limited to the adjustment technique 1. In an adjustment technique 2, the control voltage Vc stored in the storage unit 6 or setting value storage unit 54 in Step S11 of the adjustment technique 1 is set to an initial value Vc0 of the control voltage Vc in the next received resonant frequency adjustment processing. In the case that the received resonant frequency adjustment processing is performed using the initial value, the adjustment is started from the state in which the control voltage Vc is close to the optimum value, so that a time necessary for the received resonant frequency adjustment processing can be shortened.

Figure 12:
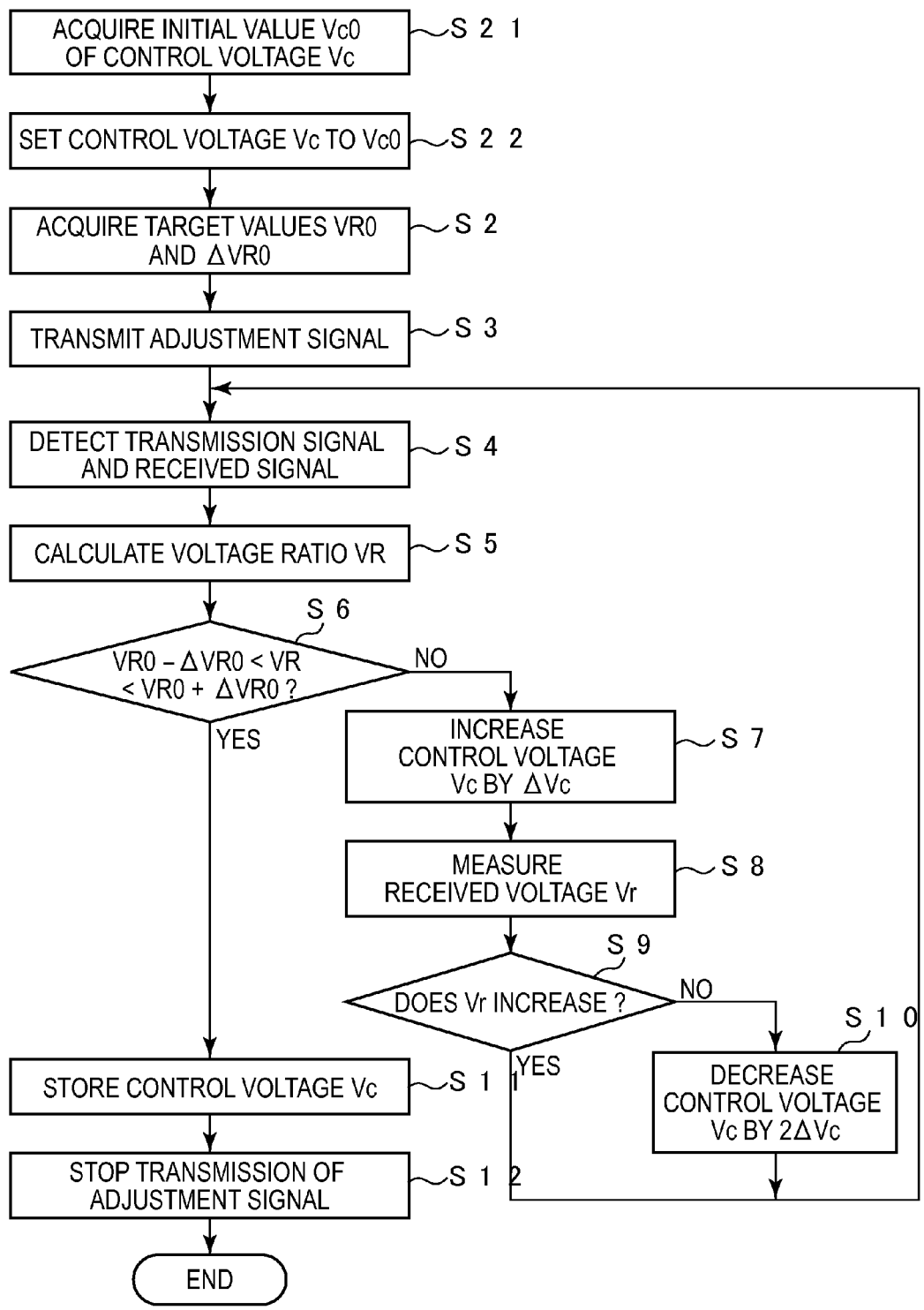
FIG. 12 is a flowchart illustrating a processing procedure of a resonant frequency adjustment technique 2 in the first embodiment.

The received resonant frequency adjustment technique 2 will specifically be described with reference to FIG. 12. FIG. 12 is a flowchart illustrating the specific processing procedure of the adjustment technique 2. In the flowchart in FIG. 12, the same processing step as that in FIG. 11 is designated by the same reference sign.

In the adjustment technique 2, the error amplifier 55 reads the initial value Vc0 of the control voltage Vc from the storage unit 6 or the setting value storage unit 54 (Step S21). The control circuit 7 seta the control voltage Vc applied to the receiver 10 (the reception antenna 30) to the initial value Vc0 (Step S22). Then, the same pieces of processing as those from Step S2 of the adjustment technique 1 in the flowchart in FIG. 11 are performed to adjust the received resonant frequency within the desired range.

(3) Adjustment Technique 3

In an adjustment technique 3, the phase difference φ between the received signal and the transmission signal is used as the adjustment parameter for the received resonant frequency. The control voltage Vc is adjusted such that the phase difference φ becomes a predetermined target value φ0 (the setting value), thereby adjusting the received resonant frequency to the optimum value.

Specifically, in the adjustment mode, the adjustment signal Sg3 having the same carrier frequency as the desired received resonant frequency is transmitted from the transmission circuit 2 to the reception circuit 1, and the phase difference φ between the received voltage and the transmission voltage is measured. The operation is repeated while the control voltage Vc applied to the resonance capacitor 36 of the reception circuit 1 is changed, and the control voltage Vc is adjusted such that the phase difference φ becomes a desired value (for example, 64 degrees in the example of the transmission/reception system having the characteristics in FIGS. 5 to 10).

Figure 13:
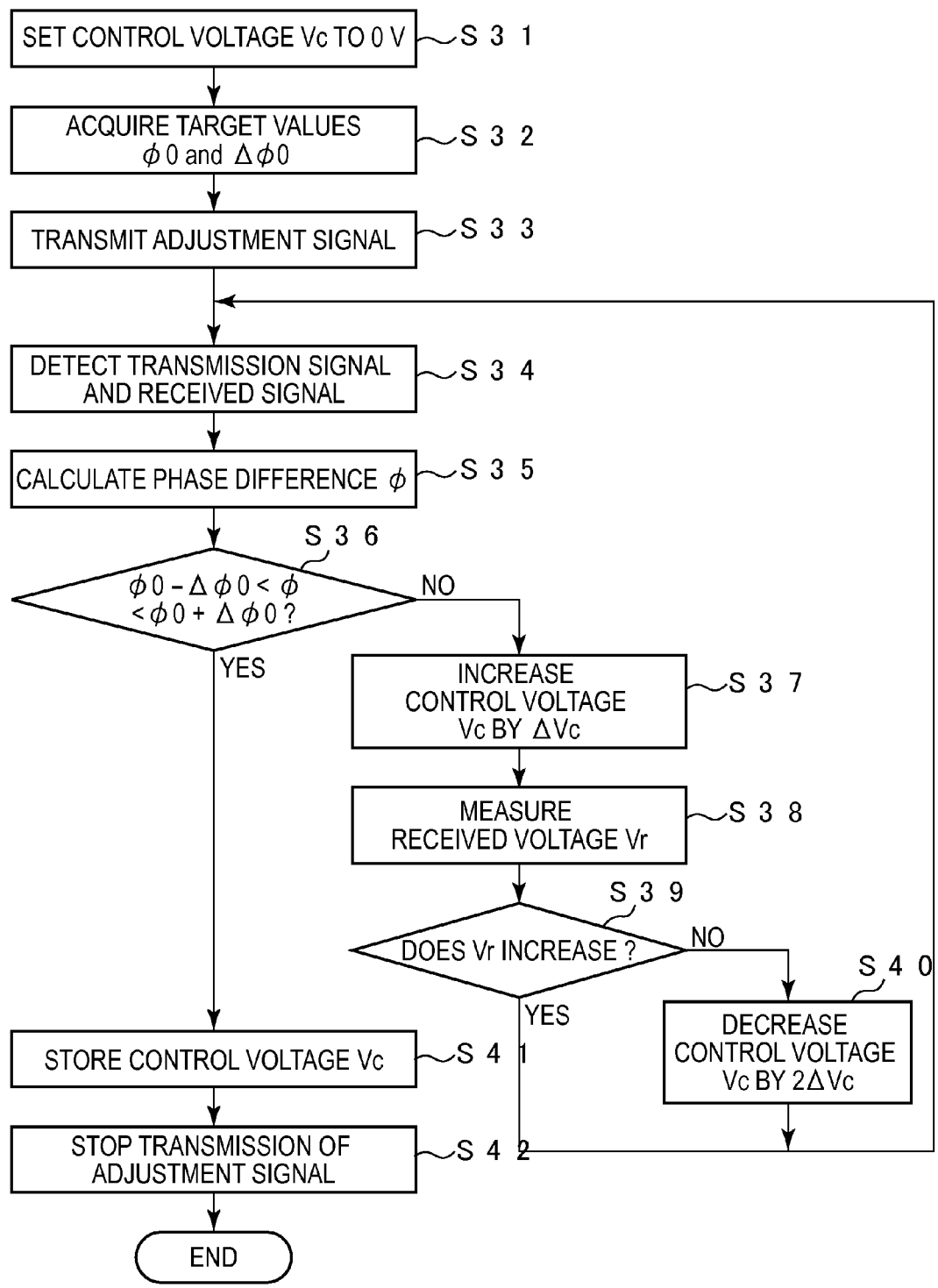
FIG. 13 is a flowchart illustrating a processing procedure of a resonant frequency adjustment technique 3 in the first embodiment.

The processing procedure of the received resonant frequency adjustment technique 3 will be described in detail with reference to FIG. 13. FIG. 13 is a flowchart illustrating the specific processing procedure of the adjustment technique 3.

The control circuit 7 sets the operating mode to the resonant frequency adjustment mode, and sets the control voltage Vc applied to the receiver 10 (the reception antenna 30) to 0 V (Step S31). At this point, the control circuit 7 decreases the Q value of the reception antenna 30 to reduce the influence of the external R/W device like the adjustment technique 1.

Then the error amplifier 55 acquires a target value φ0 of the phase difference φ and an adjustment allowable range Δφ0 of the target value φ0 from the setting value storage unit 54 (Step S32).

The transmission circuit 2 transmits the adjustment signal Sg3 having the predetermined carrier frequency (the same frequency as the received resonant frequency) to the reception circuit 1 (Step S33). The adjustment mode circuit unit 13 of the reception circuit 1 detects the transmission signal and received signal of the adjustment signal Sg3 like the adjustment technique 1 (Step S34).

The adjustment value detector 53 calculates the phase difference φ between the received signal and the transmission signal from the detected received signal and transmission signal of the adjustment signal Sg3 (Step S35).

The error amplifier 55 compares the phase difference φ calculated in Step S35 to the target value φ0, and determines whether the phase difference φ is greater than φ0−Δφ0 while being less than φ0+Δφ0 (Step S36).

When the phase difference φ does not satisfy the determination condition (φ0−Δφ0<φ<φ0+Δφ0) in Step S36, the negative determination is made in Step S36. In this case, the error amplifier 55 outputs the error signal ΔV to the control circuit 7 because the resonant frequency of the reception antenna 30 is not adjusted within the desired range. Based on the error signal ΔV, the control circuit 7 increases the control voltage Vc by ΔVc (Step S37).

The reception circuit 1 receives the adjustment signal Sg3 while the increased control voltage Vc is applied, and the adjustment value detector 53 detects the received voltage Vr of the adjustment signal Sg3 (Step S38).

Like the adjustment technique 1, the control circuit 7 determines whether the received voltage Vr of the adjustment signal Sg3 detected in Step S38 increases compared with that before the increase in control voltage Vc (Step S39).

When the control circuit 7 determines that the received voltage Vr increases in Step S39, the affirmative determination is made in Step S39. Because this case means that the optimum value of the control voltage Vc exists in the direction in which the control voltage Vc is increased (see FIG. 7), the flow returns to Step S34 while the control voltage Vc is increased, and the pieces of processing from Step S34 are repeated.

On the other hand, when the control circuit 7 determines that the received voltage Vr does not increase in Step S39, the negative determination is made in Step S39. Because this case means that the optimum value of the control voltage Vc does not exist in the direction in which the control voltage Vc is increased, the control circuit 7 decreases the control voltage Vc by 2ΔVc (Step S40). Then the flow returns to Step S34, and the pieces of processing from Step S34 are repeated.

In the adjustment technique 3, the pieces of processing in Steps S34 to S40 are repeated until the phase difference φ satisfies the determination condition in Step S36 (φ0−Δφ0<φ<φ0+Δφ0), namely, until the resonant frequency of the reception antenna 30 falls within the desired range.

When the phase difference φ satisfies the determination condition in Step S36, the affirmative determination is made in Step S36. In this case, because the resonant frequency of the reception antenna 30 is adjusted within the desired range, the adjustment value detector 53 outputs the hold signal indicating that the adjustment mode is ended to the control circuit 7. Based on the input hold signal, the control circuit 7 stores the current control voltage Vc in the storage unit 6 or the setting value storage unit 54 while maintaining the current control voltage Vc (Step S41).

The transmission circuit 2 stops the transmission of the adjustment signal Sg3 (Step S42), and ends the received resonant frequency adjustment processing. In the case that the phase difference φ between the received voltage and the transmission voltage of the adjustment signal Sg3 is used as the adjustment parameter for the received resonant frequency, as described above, the received resonant frequency is adjusted to correct the deviation of the received resonant frequency.

In the adjustment technique 3, because the phase difference φ is used as the adjustment parameter for the resonant frequency, as described above, the resonant frequency is hardly influenced by the variation in transmission voltage Vt or the change in Q value of the antenna. However, the change in Q value of the reception antenna 30 has the influence on the resonant frequency in the case that the mobile communication terminal is used as the IC card, and the change in Q value of the transmission antenna 20 has the influence on the resonant frequency in the case that the mobile communication terminal is used as the R/W.

In the adjustment technique 3, the initial value of the control voltage Vc is set to 0 V like the adjustment technique 1. However, the present invention is not limited to the adjustment technique 3. In the case that the phase difference φ is used as the adjustment parameter, the control voltage Vc0, which is stored as the initial value of the control voltage Vc in the storage unit 6 or setting value storage unit 54 in the previous adjustment, may be used like the adjustment technique 2. In this case, the adjustment parameter may be replaced from the voltage ratio VR to the phase difference φ in the flowchart of the adjustment technique 2 in FIG. 12.

(4) Adjustment Technique 4

In an adjustment technique 4, the transmission voltage Vt is used as the adjustment parameter for the received resonant frequency. The control voltage Vc is adjusted such that the transmission voltage Vt becomes a predetermined target value Vt0 (the setting value), thereby adjusting the received resonant frequency to the optimum value.

Specifically, in the adjustment mode, the adjustment signal Sg3 having the same carrier frequency as the desired received resonant frequency is transmitted from the transmission circuit 2 to the reception circuit 1, and the transmission voltage Vt is measured. The operation is repeated while the control voltage Vc applied to the reception circuit 1 is changed, and the control voltage Vc is adjusted such that the transmission voltage Vt becomes a desired value (for example, the peak-to-peak value of 1.03 V in the example of the transmission/reception system having the characteristics in FIGS. 5 to 10).

Figure 14:
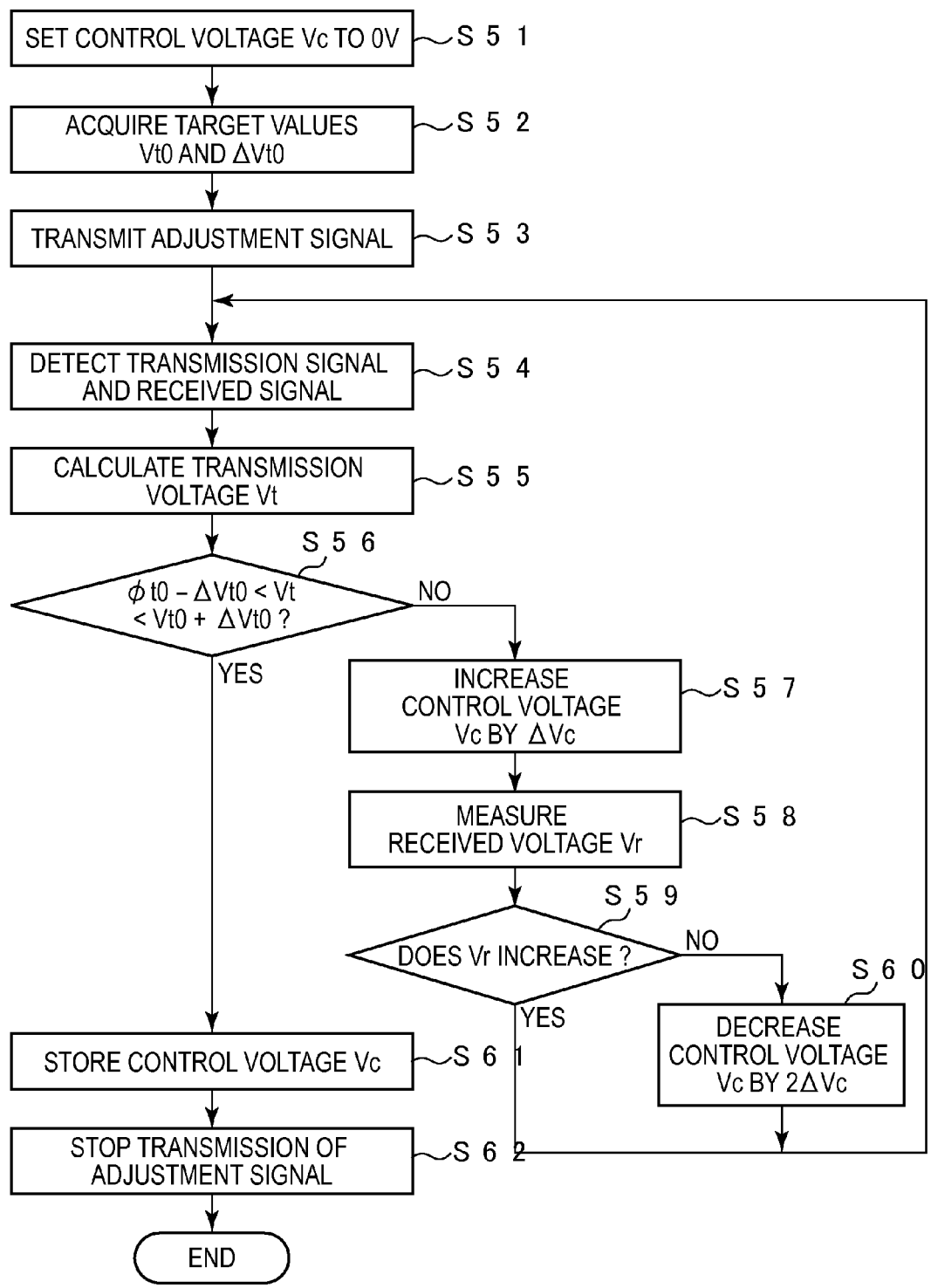
FIG. 14 is a flowchart illustrating a processing procedure of a resonant frequency adjustment technique 4 in the first embodiment.

The processing procedure of the received resonant frequency adjustment technique 4 will be described in detail with reference to FIG. 14. FIG. 14 is a flowchart illustrating the specific processing procedure of the adjustment technique 4.

The control circuit 7 sets the operating mode to the resonant frequency adjustment mode, and sets the control voltage Vc applied to the receiver 10 (the reception antenna 30) to 0 V (Step S51). At this point, the control circuit 7 decreases the Q value of the reception antenna 30 to reduce the influence of the external R/W device like the adjustment technique 1.

Then the error amplifier 55 acquires a target value Vt0 of the transmission voltage Vt and an adjustment allowable range ΔVt0 of the target value Vt0 from the setting value storage unit 54 (Step S52).

The transmission circuit 2 transmits the adjustment signal Sg3 having the predetermined carrier frequency (the same frequency as the received resonant frequency) to the reception circuit 1 (Step S53). The adjustment mode circuit unit 13 of the reception circuit 1 detects the transmission signal and received signal of the adjustment signal Sg3 like the adjustment technique 1 (Step S54).

The adjustment value detector 53 calculates the transmission voltage Vt from the detected transmission signal of the adjustment signal Sg3 (Step S55).

The error amplifier 55 compares the transmission voltage Vt calculated in Step S55 to the target value Vt0, and determines whether the transmission voltage Vt is greater than Vt0−ΔVt0 while being less than Vt0+ΔVt0 (Step S56).

When the transmission voltage Vt does not satisfy the determination condition (Vt0−ΔVt0<Vt<Vt0+ΔVt0) in Step S56, the negative determination is made in Step S56. In this case, the error amplifier 55 outputs the error signal ΔV to the control circuit 7 because the resonant frequency of the reception antenna 30 is not adjusted within the desired range. Based on the error signal ΔV, the control circuit 7 increases the control voltage Vc by ΔVc (Step S57).

Then, the reception circuit 1 receives the adjustment signal Sg3 while the increased control voltage Vc is applied, and the adjustment value detector 53 detects the received voltage Vr of the adjustment signal Sg3 (Step S58).

Like the adjustment technique 1, the control circuit 7 determines whether the received voltage Vr of the adjustment signal Sg3 detected in Step S58 increases compared with that before the increase in control voltage Vc (Step S59).

When the control circuit 7 determines that the received voltage Vr increases in Step S59, the affirmative determination is made in Step S59. Because this case means that the optimum value of the control voltage Vc exists in the direction in which the control voltage Vc is increased (see FIG. 7), the flow returns to Step S54 while the control voltage Vc is increased, and the pieces of processing from Step S54 are repeated.

On the other hand, when the control circuit 7 determines that the received voltage Vr does not increase in Step S59, the negative determination is made in Step S59. Because this case means that the optimum value of the control voltage Vc does not exist in the direction in which the control voltage Vc is increased, the control circuit 7 decreases the control voltage Vc by 2ΔVc (Step S60). Then the flow returns to Step S54, and the pieces of processing from Step S54 are repeated.

In the adjustment technique 4, the pieces of processing in Steps S54 to S60 are repeated until the transmission voltage Vt satisfies the determination condition in Step S56 (Vt0−ΔVt0<Vt<Vt0+ΔVt0), namely, until the resonant frequency of the reception antenna 30 falls within the desired range.

When the transmission voltage Vt satisfies the determination condition in Step S56, the affirmative determination is made in Step S56. In this case, because the resonant frequency of the reception antenna 30 is adjusted within the desired range, the adjustment value detector 53 outputs the hold signal indicating that the adjustment mode is ended to the control circuit 7. Based on the input hold signal, the control circuit 7 stores the current control voltage Vc in the storage unit 6 or the setting value storage unit 54 while maintaining the current control voltage Vc (Step S61).

The transmission circuit 2 stops the transmission of the adjustment signal Sg3 (Step S62), and ends the received resonant frequency adjustment processing. In the case that the transmission voltage Vt of the adjustment signal Sg3 is used as the adjustment parameter for the received resonant frequency, as described above, the received resonant frequency is adjusted to correct the deviation of the received resonant frequency.

In the adjustment technique 4, the initial value of the control voltage Vc is set to 0 V like the adjustment technique 1. However, the present invention is not limited to the adjustment technique 4. In the case that the transmission voltage Vt is used as the adjustment parameter, the control voltage Vc0, which is stored as the initial value of the control voltage Vc in the storage unit 6 or setting value storage unit 54 in the previous adjustment, may be used like the adjustment technique 2. In this case, the adjustment parameter may be replaced from the voltage ratio VR to the transmission voltage Vt in the flowchart of the adjustment technique 2 in FIG. 12.

In the resonant frequency adjustment technique, by way of example, whether the control voltage Vc increases is determined using the received voltage Vr of the adjustment signal Sg3. However, the present invention is not limited to the above resonant frequency adjustment technique. In the case that the adjustment parameter increases or decreases monotonously with respect to the control voltage Vc like the phase difference φ and voltage ratio VR in FIG. 7, the resonant frequency can be adjusted without determining whether the control voltage Vc increases using the received voltage Vr. For example, the measured phase difference φ is compared to the target value φ0, the control voltage Vc is increased by ΔV when the phase difference φ is greater than the target value φ0, the control voltage Vc is decreased by ΔV when the phase difference φ is less than the target value φ0, which allows the phase difference φ to converge into the target range of φ0±Δφ0.

In the case that the received voltage Vr is not used in the adjustment of the resonant frequency, the transmission signal of the adjustment signal Sg3 may be monitored in adjustment technique 4, so that the resonant frequency can be adjusted while the transmission system (the transmission function unit) and the reception system (the reception function unit) are separated. Therefore, the adjustment technique 4 can also be applied to the case, in which the transmission function unit is provided in an external received resonant frequency adjustment tool and the received resonant frequency of the mobile communication terminal is adjusted with the adjustment tool. In this case, even after the mobile communication terminal is assembled, the received resonant frequency can easily be adjusted with the adjustment tool.

Additionally, in the adjustment technique 4, it is not necessary to monitor the received signal of the adjustment signal Sg3, and it is not necessary to output the received signal to the external device. Therefore, in the adjustment technique 4, the system can further be simplified in the adjustment of the resonant frequency.

As described above, in the mobile communication terminal of the first embodiment, the deviation of the resonant frequency of the reception circuit 1 in the non-contact communication unit 100 having the IC card function and the R/W function is adjusted using the adjustment signal Sg3 transmitted from the transmission circuit 2 of the non-contact communication unit 100. That is, in the first embodiment, even if the resonant frequency of the reception antenna 30 of the non-contact communication unit 100 is deviated by various causes, such as the environment change and the change with time of the component, the resonant frequency of the reception antenna 30 can easily be adjusted in the own terminal. Therefore, according to the first embodiment, the stable communication characteristics having excellent resistance to various causes, such as the environment change and the change with time of the component, can be obtained.

The variation of the adjustment condition is hardly influenced in the case that the voltage ratio VR between the received signal and the transmission signal, the phase difference φ between the received signal and the transmission signal, or the transmission voltage Vt is used as the adjustment parameter for the received resonant frequency like the first embodiment.

In the received resonant frequency adjustment technique of the first embodiment, it is only necessary to observe the waveforms of the received voltage and/or transmission voltage, so that the adjustment parameter for the resonant frequency can easily be detected to perform the adjustment in less time. In the first embodiment, the necessity of an expensive dedicated measurement instrument, such as a network analyzer, which measures the voltage, can be eliminated to largely reduce adjustment cost.

In the first embodiment, by way of example, the resonant frequency is adjusted based on the adjustment signal Sg3 and/or the voltage of the received signal. However, the present invention is not limited to the first embodiment. For example, the resonant frequency may be adjusted based on the adjustment signal Sg3 and/or a current of the received signal. However, in this case, it is necessary to use a current waveform measuring resistor. Therefore, from the viewpoint of device simplicity, preferably the resonant frequency is adjusted based on the voltage like the first embodiment.

In the first embodiment, by way of example, the variable-capacitance capacitor in which the capacitance changes by applying the control voltage Vc is used to change the received resonant frequency. However, the present invention is not limited to the first embodiment. The resonance capacitor 36 is constructed by plural constant-capacitance capacitors having different capacitances, and the control circuit 7 may adjust the received resonant frequency by performing switching control of the constant-capacitance capacitors connected to the resonance coil 31. In this case, for example, the pieces of processing, such as the processing of initially setting the control voltage Vc, the processing of increasing or decreasing the control voltage Vc, and the processing of storing the control voltage Vc, in Steps S1, S7, S10, and S11 in FIG. 11 may be changed to the pieces of processing, such as the processing of initially setting a switching control signal for the constant-capacitance capacitor, the processing of changing the constant-capacitance capacitor, and the processing of storing the constant-capacitance capacitor.

2. Second Embodiment

A received resonant frequency adjustment technique (hereinafter referred to as an offset adjustment) in the case that the carrier frequency of the adjustment signal Sg3 and the resonant frequency of the reception circuit 1 differ from each other will be described in a second embodiment.

Although the second embodiment differs from the first embodiment in the received resonant frequency adjustment technique, the second embodiment is identical to the first embodiment in the configurations of the mobile communication terminal and non-contact communication unit (FIGS. 1 and 2). Therefore, in the second embodiment, the description of each unit of the mobile communication terminal is omitted and only the received resonant frequency offset adjustment technique is described. However, the control circuit 7 controls the received resonant frequency offset adjustment of the second embodiment.

In the second embodiment, because reference data 1 or 2 is used in the target transmitting/receiving circuit system during the offset adjustment, the reference data 1 or 2 is previously prepared and stored in the setting value storage unit 54. The reference data 1 or 2 may be stored in the storage unit 6 of the non-contact communication unit 100.

Figure 15:
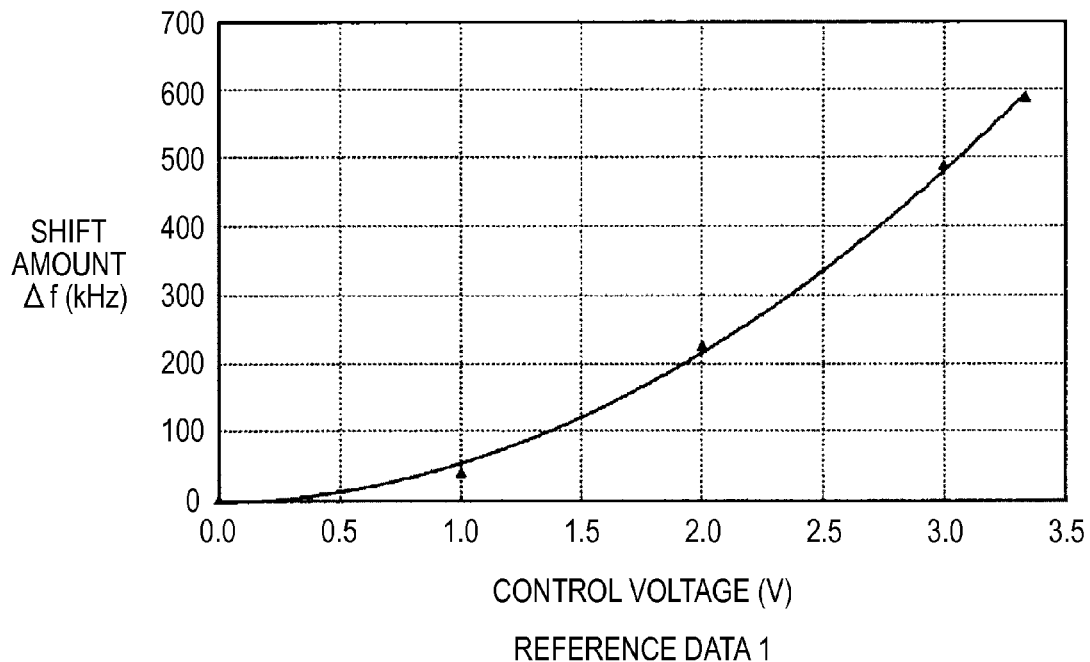
FIG. 15 is a view illustrating an example of a relationship between a control voltage and a resonant frequency shift amount, which are used in a resonant frequency offset adjustment technique 1 in a mobile communication terminal according to a second embodiment.

Reference data 1: reference data indicating a relationship between the control voltage Vc and a shift amount Δf of the received resonant frequency Reference data 2: reference data indicating a relationship between the phase difference φ between the received signal and the transmission signal and the carrier frequency FIG. 15 illustrates the reference data 1 indicating the relationship between the control voltage Vc and the shift amount Δf of the received resonant frequency, the horizontal axis indicates the control voltage Vc, and the vertical axis indicates the shift amount Δf of the received resonant frequency with respect to the received resonant frequency at the control voltage Vc of 0 V. The reference data 1 in FIG. 15 is measured with the measurement system 200 that is used in the verification experiments of the first embodiment. The reference data 1 is used in an offset adjustment technique 1.

Figure 16:
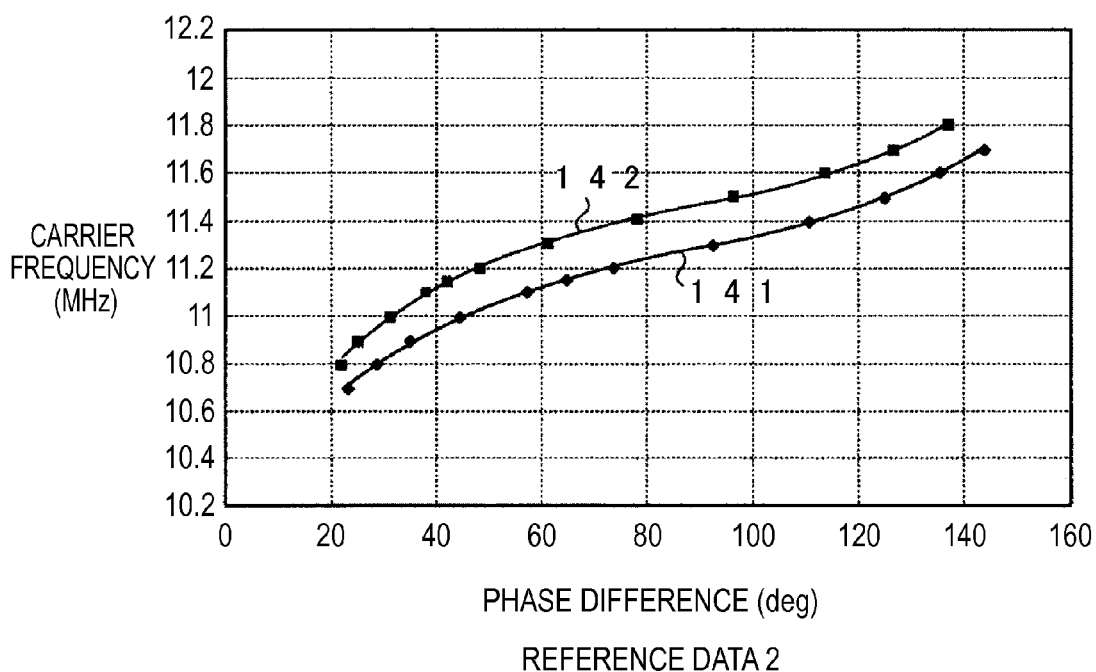
FIG. 16 is a view illustrating an example of the relationship between the control voltage and the resonant frequency shift amount, which are used in a resonant frequency offset adjustment technique 2 in the mobile communication terminal of the second embodiment.

FIG. 16 illustrates the reference data 2 indicating the relationship between the phase difference φ between the received signal and the transmission signal and the carrier frequency of the transmission signal (the adjustment signal), the horizontal axis indicates the phase difference φ, and the vertical axis indicates the carrier frequency. In FIG. 16, a characteristic 141 expresses the reference data 2 at the control voltage Vc of 0 V, and a characteristic 142 expresses the reference data 2 at the control voltage Vc of 2.25 V. The pieces of reference data 2 in FIG. 16 are also measured with the measurement system 200 that is used in the verification experiments of the first embodiment. The pieces of reference data 2 are used in an offset adjustment technique 2.

As is clear from FIG. 16, it is found that, although the characteristic indicating the relationship between the phase difference φ and the carrier frequency changes by the control voltage Vc, curves (cubic curves) of the characteristic 141 at the control voltage Vc of 0 V and the characteristic 142 at the control voltage Vc of 2.25 V have the substantially same shape. That is, it is found that the amount of change in carrier frequency with respect to the change in phase difference φ is substantially kept constant irrespective of the control voltage Vc although the relationship between the phase difference φ and the carrier frequency changes by the control voltage Vc. Therefore, in the case that the offset adjustment technique 2 is performed in the second embodiment, the reference data 2 at a predetermined control voltage Vc (for example, 0 V) is previously prepared and stored in the setting value storage unit 54.

[Offset Adjustment Technique 1]

Figure 17:
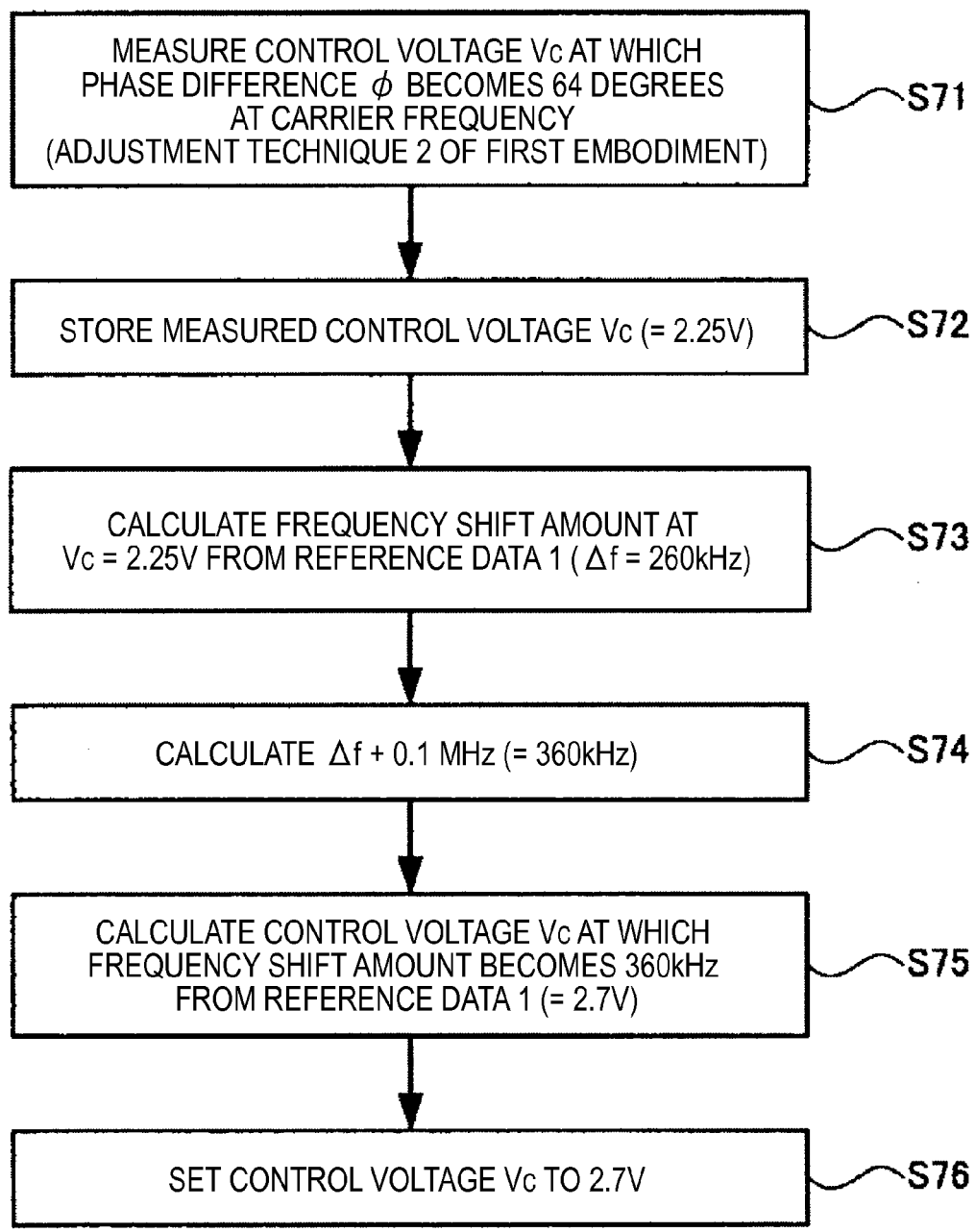
FIG. 17 is a flowchart illustrating a processing procedure of the resonant frequency adjustment technique 1 in the second embodiment.

The received resonant frequency offset adjustment technique 1 in which the reference data 1 in FIG. 15 indicating the relationship between the control voltage Vc and the shift amount Δf of the received resonant frequency will be described with reference to FIG. 17. FIG. 17 is a flowchart illustrating the processing procedure of the offset adjustment technique 1.

At this point, by way of example, the resonant frequency of the reception antenna 30 is set to 11.4 MHz using the adjustment signal Sg3 (the transmission signal) having the carrier frequency of 11.3 MHz in the offset adjustment technique 1.

In the resonant frequency adjustment mode, the non-contact communication unit 100 adjusts the received resonant frequency to 11.3 MHz using the adjustment signal Sg3 having the carrier frequency of 11.3 MHz. At this point, for example, according to the processing procedure of the adjustment technique 2 (FIG. 13) of the first embodiment, the control circuit 7 adjusts the control voltage Vc such that the phase difference φ becomes a predetermined target value (64 degrees in the example of the transmission/reception system having the characteristics in FIGS. 5 to 10) at the carrier frequency of 11.3 MHz.

The control circuit 7 measures the control voltage Vc when the phase difference φ becomes the predetermined target value at the carrier frequency of 11.3 MHz (Step S71). In the example of the transmission/reception system having the characteristics in FIGS. 5 to 10, the control voltage Vc is 2.25 V when the phase difference φ becomes 64 degrees at the carrier frequency of 11.3 MHz.

Then the control circuit 7 stores the control voltage Vc (=2.25 V) measured in Step S71 (Step S72). The control voltage Vc measured in Step S71 may be stored in the setting value storage unit 54, or temporarily stored in, for example, the storage unit 6 or a RAM of the control circuit 7.

Then the control circuit 7 reads the reference data 1 in FIG. 15 from the setting value storage unit 54, and calculates the shift amount Δf of the resonant frequency at the control voltage Vc (=2.25 V) measured in Step S71 (Step S73). In the example of the transmission/reception system having the characteristics in FIGS. 5 to 10, because the control voltage Vc=2.25 V is obtained in Step S71, the shift amount Δf of 260 kHz of the resonant frequency is obtained in Step S73.

Because 11.3 MHz is offset-adjusted to 11.4 MHz, the control circuit 7 calculates a total shift amount $Δf_O$ of Δf+0.1 MHz of the received resonant frequency (Step S74). In the example in FIGS. 5 to 10, the total shift amount $Δf_O$ of 360 kHz is obtained from the reference data 1 in FIG. 15.

Then the control circuit 7 calculates the control voltage Vc, which becomes the total shift amount $Δf_O$ (=360 kHz) calculated in Step S64, from the reference data 1 in FIG. 15 (Step S75). In the reference data in FIG. 15, the control voltage Vc of 2.7 V is obtained in Step S75. This means that the transmission/reception system (the transmission/reception system having the characteristics in FIGS. 5 to 10) of the current target is one in which the resonant frequency is shifted by 360 kHz by setting the control voltage Vc to 2.7 V.

The control circuit 7 sets the control voltage Vc applied to the reception antenna 30 to the control voltage Vc (=2.7 V) calculated in Step S75 (Step S76). As a result, the resonant frequency of the reception antenna 30 becomes carrier 11.4 MHz that is higher by 0.1 MHz than the frequency of 11.3 MHz.

Thus, in the offset adjustment technique 1, the resonant frequency of the reception antenna 30 is offset-adjusted to the desired value.

[Offset Adjustment Technique 2]

Figure 18:
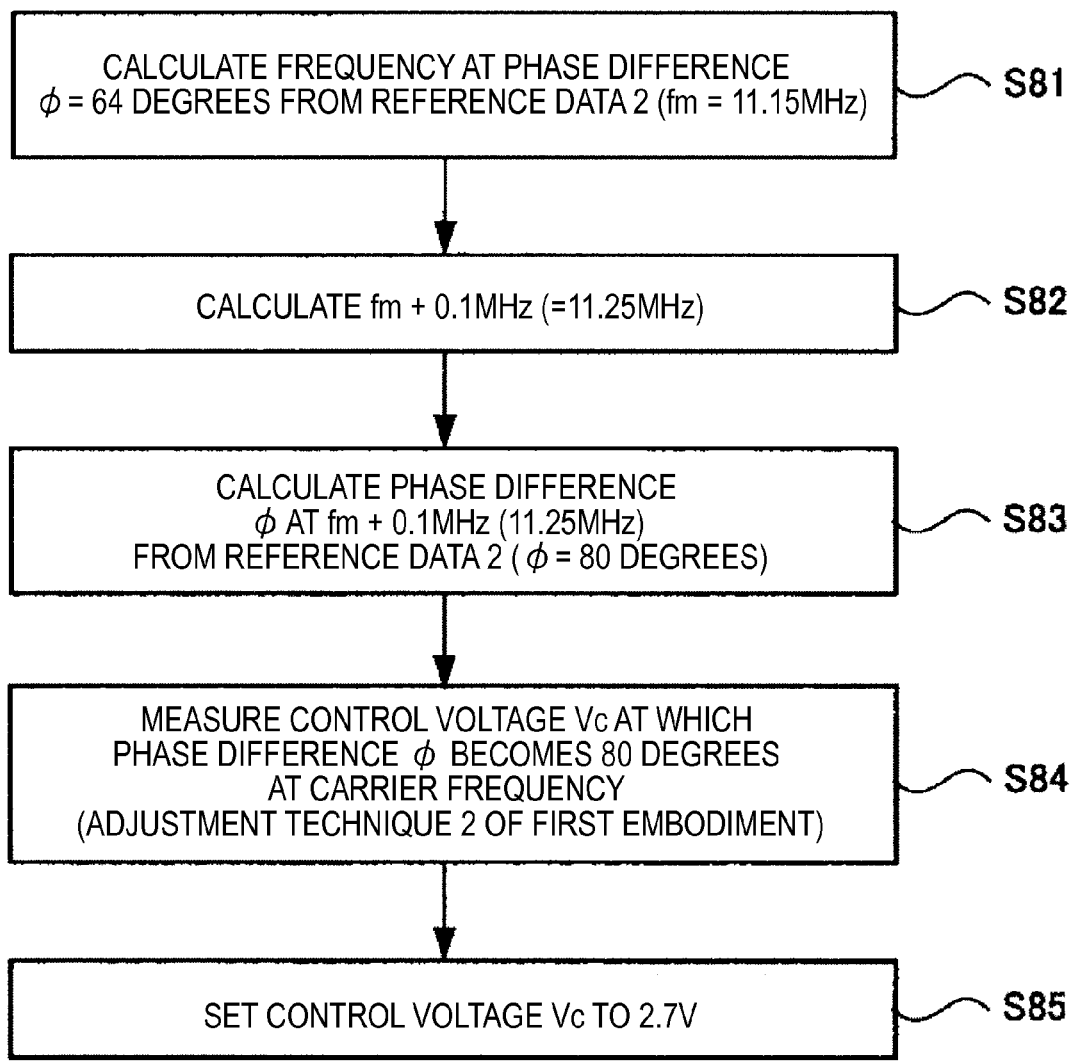
FIG. 18 is a flowchart illustrating a processing procedure of the resonant frequency adjustment technique 2 in the second embodiment.

Next, a received resonant frequency offset adjustment technique 2 in which the reference data 2 indicating the relationship in FIG. 16 between the phase difference φ and the carrier frequency is used will be described below with reference to FIG. 18. FIG. 18 is a flowchart illustrating the processing procedure of the offset adjustment technique 2.

At this point, by way of example, the resonant frequency of the reception antenna 30 is set to 11.4 MHz using the adjustment signal Sg3 (the transmission signal) having the carrier frequency of 11.3 MHz in the offset adjustment technique 2. In the offset adjustment technique 2, by way of example, the offset adjustment is performed using the reference data 2 (the characteristic 141) at the control voltage Vc of 0 V in FIG. 16. However the present invention is not limited to the reference data 2 at the control voltage Vc of 0 V. For example, the offset adjustment may be performed using the reference data 2 (the characteristic 142) at the control voltage Vc of 2.25 V in FIG. 16.

The control circuit 7 reads the reference data 2 in FIG. 16 indicating the relationship between the phase difference φ and the carrier frequency from the setting value storage unit 54. The control circuit 7 calculates the carrier frequency (the resonant frequency) $f_m$ from the reference data 2 in the phase difference φ (64 degrees in the example of the transmission/reception system having the characteristics in FIGS. 5 to 10) in which the received voltage Vr becomes the maximum (Step S81). In the example of the transmission/reception system having the characteristics in FIGS. 5 to 10, the carrier frequency fm of 11.15 MHz is obtained at the phase difference φ of 64 degrees from the reference data 2 in FIG. 16.

In the offset adjustment technique 2, in order to perform the processing in Step S71, such data as the result 3 of the verification experiment 3 in FIG. 9 is previously obtained to calculate the phase difference φ in which the received voltage Vr becomes the maximum in the target transmission/reception system of the mobile communication terminal. For example, the calculation result is stored in the setting value storage unit 54.

Because the received resonant frequency is offset-adjusted by +0.1 MHz from the carrier frequency, the control circuit 7 calculates fm+0.1 MHz (Step S82). In the example of the transmission/reception system having the characteristics in FIGS. 7 and 8, fm+0.1 MHz becomes 11.25 MHz.

Then the control circuit 7 calculates the phase difference φ in which the frequency (=fm+0.1 MHz) calculated in Step S82 is obtained from the reference data 2 in FIG. 16 (Step S83). In the example of the transmission/reception system having the characteristics in FIGS. 5 to 10 (fm+0.1 MHz=11.25 MHz), the phase difference φ of 80 degrees is obtained from the reference data 2 in FIG. 16.

Then, using the adjustment signal Sg3 having the carrier frequency of 11.3 MHz, the control circuit 7 adjusts the received resonant frequency according to the adjustment technique 2 (FIG. 13) of the first embodiment. However, at this point, the adjustment is performed while the target value of the phase difference φ constituting the adjustment parameter of the received resonant frequency is set to the phase difference φ calculated in Step S83, and the optimum control voltage Vc is measured (Step S84). In the example of the transmission/reception system having the characteristics in FIGS. 5 to 10, the target value of the phase difference φ is set to 80 degrees. In this case, like the offset adjustment technique 1, the control voltage Vc becomes 2.7 V in the transmission/reception system.

Then the control circuit 7 sets the control voltage Vc applied to the reception antenna 30 to the control voltage Vc measured in Step S84 (Step S85). In the example of the transmission/reception system having the characteristics in FIGS. 5 to 10, the control voltage Vc is set to 2.7 V. As a result, the resonant frequency of the reception antenna 30 becomes carrier 11.4 MHz that is higher by 0.1 MHz than the frequency of 11.3 MHz.

Thus, in the offset adjustment technique 2, the resonant frequency of the reception antenna 30 is offset-adjusted to the desired value.

As described above, in the second embodiment, the same effect as the first embodiment is obtained because the phase difference φ between the received signal and the transmission signal is used as the adjustment parameter for the resonant frequency. In the received resonant frequency adjustment technique of the second embodiment, the adjustment can be performed even if the carrier frequency of the adjustment signal Sg3 differs from the received resonant frequency.

3. Third Embodiment

In the first and second embodiments, by way of example, the transmission antenna 20 and the reception antenna 30 are separately provided in the non-contact communication unit 100. However, the present invention is not limited to the first and second embodiments. The present invention can also be applied to the case that one antenna is commonly used as the reception antenna and the transmission antenna in the non-contact communication unit. A configuration example in which one antenna is commonly used as the reception antenna and the transmission antenna in the non-contact communication unit will be described in a third embodiment.

[Configuration of Transmission/Reception Circuit]

Figure 19:
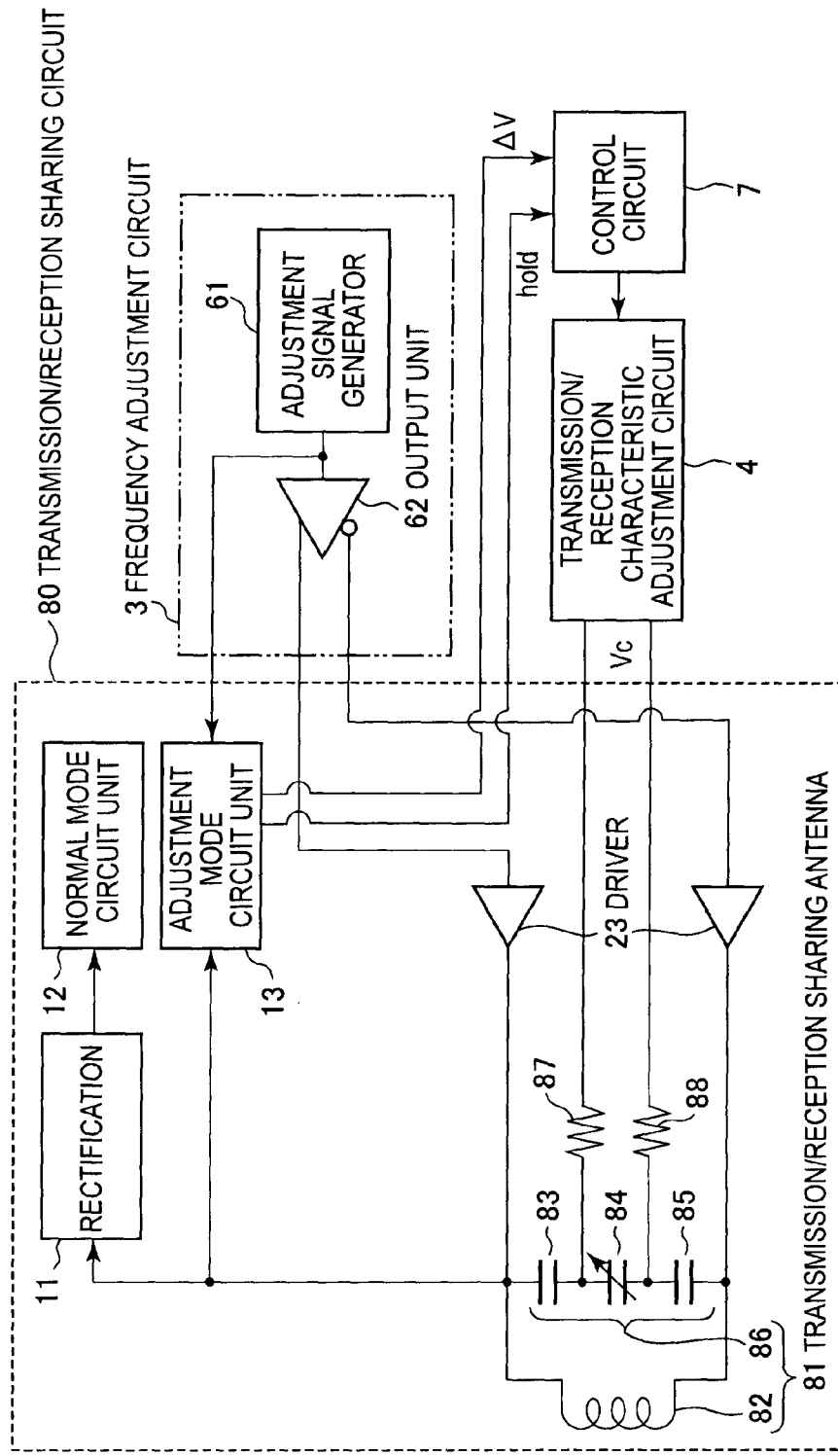
FIG. 19 is a schematic configuration diagram illustrating a transmission/reception sharing circuit of a non-contact communication unit according to a third embodiment.

FIG. 19 illustrates a schematic configuration of a transmission/reception sharing circuit in a non-contact communication unit of the third embodiment. A transmission/reception sharing circuit 80 of the third embodiment has a configuration in which the reception circuit 1 and transmission circuit 2 of the first embodiment are integrated. Therefore, in FIG. 19, the same configuration as the first embodiment (FIG. 2) is designated by the same reference sign. FIG. 19 also illustrates a connection relationship among the transmission/reception sharing circuit 80, the frequency adjustment circuit 3, the transmission/reception characteristic adjustment circuit 4, and the control circuit 7.

The transmission/reception sharing circuit 80 includes a transmission/reception sharing antenna 81, the rectifier circuit 11, the normal mode circuit unit 12, the adjustment mode circuit unit 13, and the drivers 23 that outputs a predetermined transmission signal. The configurations except the transmission/reception sharing antenna 81 are identical to those of the first embodiment. Therefore, only the configuration of the transmission/reception sharing antenna 81 will be described.

The transmission/reception sharing antenna 81 mainly includes a resonance coil 82, two constant-capacitance capacitors 83 and 85 (first and second constant-capacitance capacitors), and a variable-capacitance capacitor 84.

The variable-capacitance capacitor 84 is an electrostatic capacitance element in which the capacitance changes according to the control voltage Vc applied from the control circuit 7 through the transmission/reception characteristic adjustment circuit 4. In the third embodiment, a variable-capacitance capacitor in which the capacitance decreases with increasing control voltage Vc is used as the variable-capacitance capacitor 84.

On the other hand, the first constant-capacitance capacitor 83 and the second constant-capacitance capacitor 85 are electrostatic capacitance elements in which the capacitance hardly changes irrespective of the type (the direct current or the alternating current) of the input signal and the signal level of the input signal. The first constant-capacitance capacitor 83 and the second constant-capacitance capacitor 85 act as bias removing capacitors that suppress the influence of the interference of the control current input from the side of the control circuit 7 and the received-signal current.

In the third embodiment, the first constant-capacitance capacitor 83, the variable-capacitance capacitor 84, and the second constant-capacitance capacitor 85 are connected in series in this order to constitute one resonance capacitor 86. The resonance capacitor 86 including the group of series-connected capacitors and the resonance coil 82 are connected in parallel to constitute the resonant circuit, namely, the transmission/reception sharing antenna 81.

Both connection portions between the resonance capacitor 86 and the resonance coil 82 are connected to the corresponding drivers 23, respectively. One of the connection portions between the resonance capacitor 86 and the resonance coil 82 is connected to the rectifier circuit 11 and the adjustment mode circuit unit 13.

A connection portion between the first constant-capacitance capacitor 83 and the variable-capacitance capacitor 84 and a connection portion between the variable-capacitance capacitor 84 and the second constant-capacitance capacitor 85 are connected to the transmission/reception characteristic adjustment circuit 4 through the first current-limiting resistor 87 and the second current-limiting resistor 88, respectively. The first current-limiting resistor 87 and the second current-limiting resistor 88 are provided in order to suppress the influence of the interference of the control current input from the side of the control circuit 7 and the received-signal current.

In the third embodiment, by way of example, the variable-capacitance capacitor in which the capacitance changes according to the applied control voltage Vc is used as the resonance capacitor 86 of the transmission/reception sharing antenna 81. However, the present invention is not limited to the variable-capacitance capacitor. The resonance capacitor 86 is constructed by plural constant-capacitance capacitors having different capacitances, and the control circuit 7 may adjust the capacitance of the resonance capacitor 86 by performing the switching control of the constant-capacitance capacitors connected to the resonance coil 82.

In the third embodiment, the transmission signal is applied to both ends of the resonance coil 82 through the drivers 23. In the adjustment mode, the adjustment signal Sg3 (the received signal) applied to both the ends of the resonance coil 82 through the drivers 23 is directly transmitted to the adjustment mode circuit unit 13. That is, in the third embodiment, the received signal of the adjustment signal Sg3 is directly transmitted to the reception circuit side without passing through the electromagnetic coupling in the received resonant frequency adjustment mode. Therefore, in the third embodiment, the stable reception characteristic is obtained in the received resonant frequency adjustment mode.

In the third embodiment, the output terminal of the adjustment signal generator 61 is connected to the adjustment mode circuit unit 13, and the transmission signal of the adjustment signal Sg3 is directly transmitted to the adjustment mode circuit unit 13.

As described above, in the mobile communication terminal of the third embodiment, the configurations are identical to those of the first embodiment except that the one antenna is commonly used as the transmission antenna and the reception antenna. Therefore, in the adjustment mode, the resonant frequency of the transmission/reception sharing circuit 80 (the transmission/reception sharing antenna 81) can be adjusted like the first embodiment.

However, in the third embodiment, as described above, the received signal of the adjustment signal Sg3 is directly transmitted to the adjustment mode circuit unit 13 without passing through the electromagnetic coupling. Therefore, in the adjustment parameters (the voltage ratio VR, the phase difference φ, and the transmission voltage Vt) for the resonant frequency used in the first embodiment, the voltage ratio VR between the received voltage Vr and the transmission voltage Vt cannot be used in the third embodiment because the voltage ratio VR always becomes 1.

That is, in the third embodiment, the phase difference φ between the received signal and the transmission signal (the adjustment signal Sg3) or the transmission voltage Vt is used as the adjustment parameter for the resonant frequency to adjust the resonant frequency. Specifically, in the third embodiment, for example, the resonant frequency of the transmission/reception sharing antenna 81 is adjusted according to the adjustment technique 3 in which the phase difference φ in FIG. 13 is used or the adjustment technique 4 in which the transmission voltage Vt in FIG. 14 is used. Therefore, the same effect as the first embodiment is also obtained in the third embodiment.

In the third embodiment, the offset adjustment is performed like the second embodiment (the processing procedure in FIG. 17 or 18) in the case that the offset adjustment is performed to the resonant frequency of the transmission/reception sharing antenna 81. In this case, the same effect as the second embodiment is obtained.

In the third embodiment, the resonant frequency (the received resonant frequency) in the case that the transmission/reception sharing antenna 81 is used as the reception antenna may be identical to or different from the resonant frequency (the transmission resonant frequency) in the case that the transmission/reception sharing antenna 81 is used as the transmission antenna.

In the case that the received resonant frequency and transmission resonant frequency of the transmission/reception sharing antenna 81 are identical to each other, the received resonant frequency is adjusted like the first and second embodiments (however, the adjustment techniques 1 and 2 in FIGS. 11 and 12 in which the voltage ratio VR is used are excluded). Therefore, the transmission resonant frequency can simultaneously be adjusted. On the other hand, in the case that the received resonant frequency and transmission resonant frequency of the transmission/reception sharing antenna 81 differ from each other, the received resonant frequency and the transmission resonant frequency may separately be adjusted.

In the third embodiment, the transmission/reception sharing antenna 81 is commonly used as the transmission antenna and the reception antenna to decrease the number of antennas to one, which allows the reduction of the component cost. In the third embodiment, the number of antennas is decreased to one, so that a mounting space for the antenna can be reduced.

4. Fourth Embodiment

In the first to third embodiments, the resonant frequency adjustment technique of the present invention is applied to the mobile communication terminal including both the IC card function and the R/W function. However, the present invention is not limited to mobile communication terminal. The resonant frequency of the transmission antenna of the R/W device is also deviated by the change with time of the component or the change of the surrounding environment. In a fourth embodiment, the resonant frequency adjustment technique of the present invention is applied to the R/W device to adjust the resonant frequency (the transmission resonant frequency) of the transmission antenna.

In the R/W device of the fourth embodiment, a configuration of a non-contact communication unit that conducts communication with the external non-contact IC card is substantially identical to that of non-contact communication unit (FIG. 1) of the first embodiment. However, because the R/W device does not include the IC card function, a later-described reception circuit of the R/W device does not conduct communication with the external R/W device. That is, the reception circuit of the R/W device does not include the function of receiving the transmission signal Sg1 from the external R/W device in FIG. 1.

Figure 20:
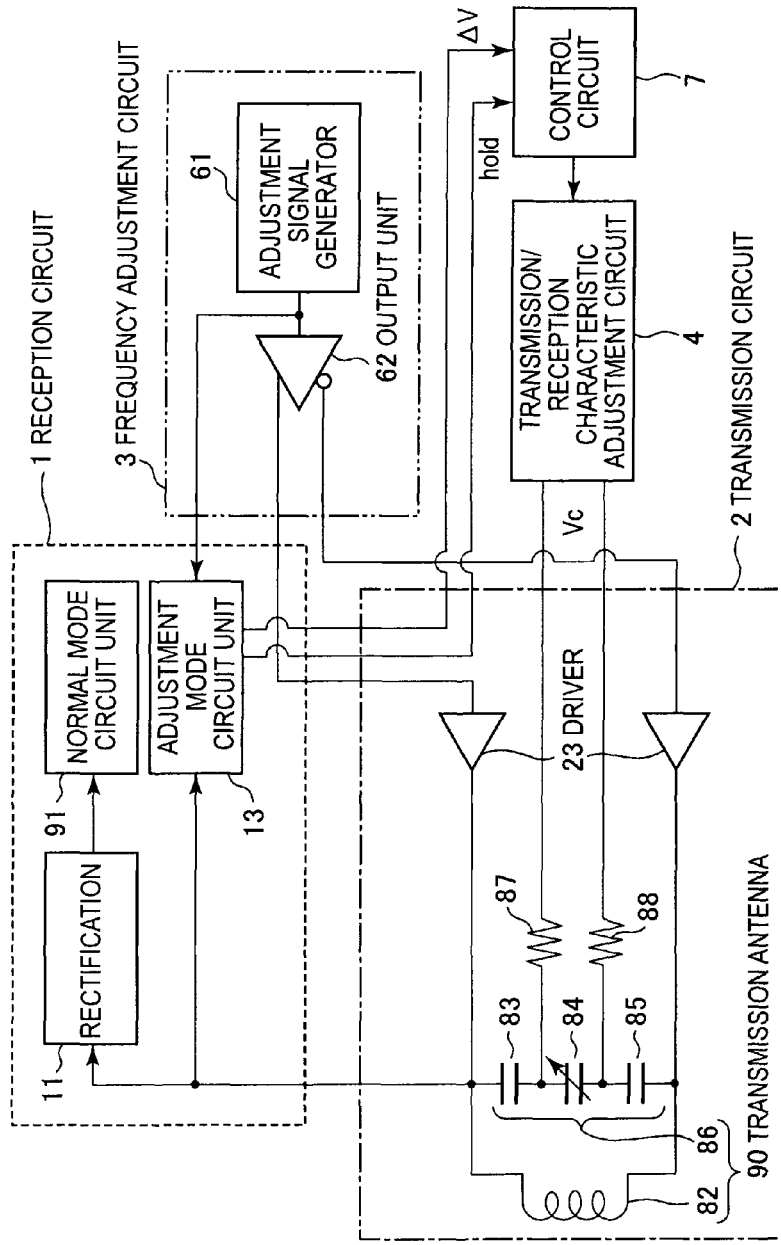
FIG. 20 is a schematic configuration diagram illustrating a reception circuit and a transmission circuit in an R/W device according to a fourth embodiment.

FIG. 20 illustrates schematic configurations of a reception circuit and a transmission circuit in the R/W device of the fourth embodiment. FIG. 20 also illustrates a connection relationship among the reception circuit 1 and the transmission circuit 2, the frequency adjustment circuit 3, the transmission/reception characteristic adjustment circuit 4, and the control circuit 7.

In the reception circuit and transmission circuit of the R/W device in FIG. 20, the same configuration as the transmission/reception sharing circuit 80 (FIG. 19) of the third embodiment is designated by the same reference sign. As is clear from comparison of FIGS. 20 and 19, the configurations of the reception circuit 1 and transmission circuit 2 in the R/W device of the fourth embodiment are substantially identical to the configuration of the transmission/reception sharing circuit 80 of the third embodiment.

The reception circuit 1 includes the rectifier circuit 11, a normal mode circuit unit 91, and the adjustment mode circuit unit 13 (the adjustment signal detector). The normal mode circuit unit 91 is a circuit unit that reads a response of the external non-contact IC card when the R/W device conducts communication with the external non-contact IC card. The rectifier circuit 11 and the adjustment mode circuit unit 13 have the same configurations as those of the first embodiment (FIG. 2).

The transmission circuit 2 (the transmitter) includes a transmission antenna 90 and the drivers 23 that output predetermined transmission signals to the transmission antenna 90. The driver 23 has the same configuration as that of the first embodiment (FIG. 2).

The transmission antenna 90 mainly includes the resonance coil 82, the constant-capacitance capacitors 83 and 85 (the first and second constant-capacitance capacitors), and the variable-capacitance capacitor 84. In the fourth embodiment, the first constant-capacitance capacitor 83, the variable-capacitance capacitor 84, and the second constant-capacitance capacitor 85 are connected in series in this order to constitute one resonance capacitor 86. The resonance capacitor 86 including the group of series-connected capacitors and the resonance coil 82 are connected in parallel to constitute the resonant circuit, namely, the transmission antenna 90.

The configurations of the resonance coil 82 and each capacitor of the fourth embodiment are identical to those of the third embodiment (FIG. 19). That is, the variable-capacitance capacitor 84 is an electrostatic capacitance element in which the capacitance changes according to the control voltage Vc applied from the control circuit 7 (the control circuit unit) through the transmission/reception characteristic adjustment circuit 4. The first constant-capacitance capacitor 83 and the second constant-capacitance capacitor 85 are electrostatic capacitance elements in which the capacitance hardly changes irrespective of the type (the direct current or the alternating current) of the input signal and the signal level of the input signal.

Like the third embodiment, both the connection portions between the resonance capacitor 86 and the resonance coil 82 are connected to the corresponding drivers 23, respectively. One of the connection portions between the resonance capacitor 86 and the resonance coil 82 is connected to the rectifier circuit 11 and the adjustment mode circuit unit 13. The connection portion between the first constant-capacitance capacitor 83 and the variable-capacitance capacitor 84 and the connection portion between the variable-capacitance capacitor 84 and the second constant-capacitance capacitor 85 are connected to the transmission/reception characteristic adjustment circuit 4 through the first current-limiting resistor 87 and the second current-limiting resistor 88, respectively.

In the fourth embodiment, by way of example, the variable-capacitance capacitor in which the capacitance changes according to the applied control voltage Vc is used as the resonance capacitor 86 of the transmission antenna 90. However, the present invention is not limited to the variable-capacitance capacitor. The resonance capacitor 86 is constructed by plural constant-capacitance capacitors having different capacitances, and the control circuit 7 may adjust the capacitance of the resonance capacitor 86 by performing the switching control of the constant-capacitance capacitors connected to the resonance coil 82.

In the fourth embodiment, the transmission signal is applied to both the ends of the resonance coil 82 through the drivers 23. In the transmission resonant frequency adjustment mode, the adjustment signal Sg3 (the received signal) applied to both the end of the resonance coil 82 from the frequency adjustment circuit 3 (the adjustment signal generator 61) through the drivers 23 is directly transmitted to the adjustment mode circuit unit 13. That is, the received signal of the adjustment signal Sg3 is directly transmitted to the side of the reception circuit 1 without passing through the electromagnetic coupling in the adjustment mode of the fourth embodiment.

In the fourth embodiment, the output terminal of the adjustment signal generator 61 is connected to the adjustment mode circuit unit 13, and the transmission signal of the adjustment signal Sg3 is directly transmitted to the adjustment mode circuit unit 13.

As described above, in the fourth embodiment, the configurations are identical to those of the first embodiment except that the received signal of the adjustment signal Sg3 is directly transmitted onto the side of the reception circuit without passing through the electromagnetic coupling. Therefore, in the R/W device of the fourth embodiment, the deviation of the transmission resonant frequency can be corrected using the resonant frequency adjustment techniques of the embodiments.

However, in the fourth embodiment, the received signal of the adjustment signal Sg3 is directly transmitted to the adjustment mode circuit unit 13 without passing through the electromagnetic coupling like the third embodiment. Therefore, in the fourth embodiment, the voltage ratio VR between the received voltage Vr and the transmission voltage Vt cannot be used as the adjustment parameter for the resonant frequency like the third embodiment.

Accordingly, in the fourth embodiment, the phase difference $\phi$ between the received signal and the transmission signal (the adjustment signal Sg3) or the transmission voltage Vt is used as the adjustment parameter for the resonant frequency to adjust the resonant frequency like the third embodiment. Specifically, in the fourth embodiment, for example, the resonant frequency of the transmission antenna 90 is adjusted according to the adjustment technique 3 in which the phase difference $\phi$ in FIG. 13 is used or the adjustment technique 4 in which the transmission voltage Vt in FIG. 14 is used.

As described above, in the R/W device of the fourth embodiment, like the above embodiments, the adjustment signal Sg3 generated in the own device is transmitted onto the side of the reception circuit 1, and the adjustment signal Sg3 is received by the reception circuit 1 to correct the deviation of the transmission resonant frequency. Therefore, in the fourth embodiment, even if the transmission resonant frequency is deviated by various causes, the deviation of the transmission resonant frequency can easily be adjusted in the own device to obtain the stable communication characteristic.

In the first to fourth embodiments, the capacitances of the resonance capacitors of the reception antenna and/or transmission antenna are adjusted to adjust the resonant frequency. However, the present invention is not limited to the first to fourth embodiments. The resonant frequency may be adjusted by adjusting an inductance of the resonance coil. In this case, a variable coil may be used as the resonance coil, or plural coils having different inductances may be used to switch the coil connected to the resonance capacitor according to a deviation amount of the resonant frequency. The resonant frequency may be adjusted by adjusting both the inductance of the resonance coil and the capacitance of the resonance capacitor.

5. Various Applications

The techniques of adjusting the resonant frequencies of the reception antenna and/or transmission antenna of the above embodiments can also be applied to various applications in addition to the mobile communication terminal and the R/W device. For example, the resonant frequency adjustment techniques of the first to third embodiments can be applied to any portable communication device as long as the portable communication device includes both the IC card function and the R/W function, and the same effect is obtained.

For example, the resonant frequency adjustment techniques of the above embodiments can also be applied to a non-contact power feeding device. Power feeding efficiency can be improved in the case that the resonant frequency adjustment techniques of the above embodiments are applied to the non-contact power feeding device.

For example, the resonant frequency adjustment techniques of the above embodiments can also be applied to a frequency adjustment tool for an LSI (Large-Scale Integration) including the transmission/reception function of the mobile communication terminal. Particularly, for example, the received resonant frequency can be adjusted in a mobile communication terminal production line in the case that the transmission voltage Vt of the adjustment signal Sg3 is used as the adjustment parameter for the resonant frequency.

More specifically, in the case that the transmission voltage Vt of the adjustment signal Sg3 is used as the adjustment parameter for the resonant frequency, the transmission function unit of the adjustment signal Sg3 and the reception function unit of the adjustment signal Sg3 can be separated as described above. That is, the transmission function unit (for example, the transmission circuit 2 and the frequency adjustment circuit 3) of the adjustment signal Sg3 can be provided in the external device.

Therefore, for example, the received resonant frequency of the mobile communication terminal can be adjusted in the middle of the production by providing the transmission function unit of the adjustment signal Sg3 in the production line for the reception antenna module of the mobile communication terminal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 Reception circuit
2 Transmission circuit
3 Frequency adjustment circuit
4 Transmission/reception characteristic adjustment circuit
5 Start-up signal output unit
6 Storage unit
7 Control circuit
10 Receiver
11 Rectifier circuit
12 Normal mode circuit unit
13 Adjustment mode circuit unit
20 Transmission antenna
21,31 Resonance coil
22,36 Resonance capacitor
30 Reception antenna
33,34 Variable-capacitance capacitor
51 Highpass filter circuit
52 Binarization processor
53 Adjustment value detector 54 Setting value storage unit
55 Error amplifier
100 Non-contact communication unit

The invention claimed is:

1. A portable communication device comprising:
a receiver that includes a reception antenna which conducts communication with an external reader/writer device by electromagnetic coupling and in which a received resonant frequency is variable;
a transmitter that includes a transmission antenna which conducts communication with an external non-contact data carrier by the electromagnetic coupling and transmits an adjustment signal to the receiver in order to adjust the received resonant frequency;
an adjustment signal generator that generates the adjustment signal and outputs the adjustment signal to the transmitter;
an adjustment signal detector that detects a parameter including information on a transmission state of the adjustment signal; and
a control circuit unit that corrects a deviation of the received resonant frequency based on a detection result of the adjustment signal detector,
wherein the reception antenna includes a variable-capacitance element in which a capacitance changes by a control voltage, and
wherein the control circuit unit adjusts the received resonant frequency by changing the control voltage applied to the variable-capacitance element based on the detection result of the adjustment signal detector,
wherein the adjustment signal detector detects a phase difference between a received signal when the receiver receives the adjustment signal and the adjustment signal as the parameter.

2. The portable communication device according to claim 1,
wherein the adjustment signal detector detects a voltage ratio between a received voltage when the receiver receives the adjustment signal and a transmission voltage of the adjustment signal as the parameter.

3. The portable communication device according to claim 2, further comprising
a target value storage unit in which information on a range to adjust the voltage ratio is previously stored,
wherein the control circuit unit adjusts the control voltage applied to the variable-capacitance element in a manner that the voltage ratio detected by the adjustment signal detector falls within the range to adjust the voltage ratio.

4. The portable communication device according to claim 1, further comprising
a target value storage unit in which information on a range to adjust the phase difference is previously stored,
wherein the control circuit unit adjusts the control voltage applied to the variable-capacitance element in a manner that the phase difference detected by the adjustment signal detector falls within a predetermined range to adjust the phase difference.

5. The portable communication device according to claim 1,
wherein the adjustment signal detector detects a transmission voltage of the adjustment signal as the parameter.

6. The portable communication device according to claim 5, further comprising
a target value storage unit in which information on a range to adjust the transmission voltage is previously stored,
wherein the control circuit unit adjusts the control voltage applied to the variable-capacitance element in a manner that the transmission voltage detected by the adjustment signal detector falls within the range to adjust the transmission voltage.

7. The portable communication device according to claim 1, further comprising
a target value storage unit in which a range to adjust the phase difference and reference data are previously stored, the reference data indicating a change characteristic of a shift amount of a resonant frequency of the reception antenna with respect to a change of the control voltage,
wherein, after the control circuit unit adjusts the control voltage applied to the variable-capacitance element to a first control voltage in a manner that the phase difference detected by the adjustment signal detector falls within the range to adjust the phase difference when the received resonant frequency that should be adjusted differs from a carrier frequency of the adjustment signal, the control circuit unit specifies a control voltage corresponding to the received resonant frequency that should be adjusted from the reference data based on the first control voltage and a difference between the received resonant frequency that should be adjusted and a carrier frequency of the adjustment signal, and applies the specified control voltage to the variable-capacitance element.

8. The portable communication device according to claim 1, further comprising
a target value storage unit in which reference data and a first phase difference are previously stored, the reference data indicating a change characteristic of a carrier frequency of the adjustment signal with respect to a change of the phase difference, the first phase difference being at which a received voltage becomes the maximum when the receiver receives the adjustment signal,
wherein, after the control circuit unit specifies a second phase difference corresponding to the received resonant frequency that should be adjusted from the reference data based on the first phase difference and the received resonant frequency that should be adjusted when the received resonant frequency that should be adjusted differs from the carrier frequency of the adjustment signal, the control circuit unit adjusts the control voltage applied to the variable-capacitance element in a manner that the phase difference detected by the adjustment signal detector becomes the second phase difference.

9. The portable communication device according to claim 1,
wherein one antenna is commonly used as the reception antenna and the transmission antenna, and both a received resonant frequency of the reception antenna and a transmission resonant frequency of the transmission antenna are variable.

10. The portable communication device according to claim 1, wherein the adjustment signal detector detects a voltage ratio between a received voltage when the receiver receives the adjustment signal and a transmission voltage of the adjustment signal as the parameter.

11. The portable communication device according to claim 10, further comprising a target value storage unit in which information on a range to adjust the voltage ratio is previously stored,
wherein the control circuit unit adjusts the control voltage applied to the variable-capacitance element in a manner that the voltage ratio detected by the adjustment signal detector falls within the range to adjust the voltage ratio.

12. A resonant frequency adjustment method comprising the steps of:
transmitting an adjustment signal to a receiver of a portable communication device in order to adjust a received resonant frequency, the portable communication device including the receiver that includes a reception antenna which conducts communication with an external reader/writer device by electromagnetic coupling and in which the received resonant frequency is variable, and a transmitter that includes a transmission antenna which conducts communication with an external non-contact data carrier by the electromagnetic coupling;
detecting a parameter including information on a transmission state of the adjustment signal; and
correcting a deviation of the received resonant frequency based on the detected parameter,
wherein the reception antenna includes a variable-capacitance element in which a capacitance changes by a control voltage,
wherein the control circuit unit adjusts the received resonant frequency by changing the control voltage applied to the variable-capacitance element based on the detected parameter, and
wherein the detected parameter is a phase difference between a received signal when the receiver receives the adjustment signal and the adjustment signal.

13. A portable communication device comprising:
a receiver that includes a reception antenna which conducts communication with an external reader/writer device by electromagnetic coupling and in which a received resonant frequency is variable;
a transmitter that includes a transmission antenna which conducts communication with an external non-contact data carrier by the electromagnetic coupling and transmits an adjustment signal to the receiver in order to adjust the received resonant frequency;
an adjustment signal generator that generates the adjustment signal and outputs the adjustment signal to the transmitter;
an adjustment signal detector that detects a parameter including information on a transmission state of the adjustment signal; and
a control circuit unit that corrects a deviation of the received resonant frequency based on a detection result of the adjustment signal detector,
wherein the reception antenna includes a variable-capacitance element in which a capacitance changes by a control voltage, and
wherein the control circuit unit adjusts the received resonant frequency by changing the control voltage applied to the variable-capacitance element based on the detection result of the adjustment signal detector,
wherein the adjustment signal detector detects a voltage ratio between a received voltage when the receiver receives the adjustment signal and a transmission voltage of the adjustment signal as the parameter.

14. The portable communication device according to claim 13, further comprising a target value storage unit in which information on a range to adjust the voltage ratio is previously stored,
wherein the control circuit unit adjusts the control voltage applied to the variable-capacitance element in a manner that the voltage ratio detected by the adjustment signal detector falls within the range to adjust the voltage ratio.

15. A portable communication device comprising:
a receiver that includes a reception antenna which conducts communication with an external reader/writer device by electromagnetic coupling and in which a received resonant frequency is variable;
a transmitter that includes a transmission antenna which conducts communication with an external non-contact data carrier by the electromagnetic coupling and transmits an adjustment signal to the receiver in order to adjust the received resonant frequency;
an adjustment signal generator that generates the adjustment signal and outputs the adjustment signal to the transmitter;
an adjustment signal detector that detects a parameter including information on a transmission state of the adjustment signal; and
a control circuit unit that corrects a deviation of the received resonant frequency based on a detection result of the adjustment signal detector,
wherein the reception antenna includes a variable-capacitance element in which a capacitance changes by a control voltage, and
wherein the control circuit unit adjusts the received resonant frequency by changing the control voltage applied to the variable-capacitance element based on the detection result of the adjustment signal detector,
wherein the adjustment signal detector detects a transmission voltage of the adjustment signal as the parameter,
wherein the portable communication device further comprising a target value storage unit in which information on a range to adjust the transmission voltage is previously stored,
wherein the control circuit unit adjusts the control voltage applied to the variable-capacitance element in a manner that the transmission voltage detected by the adjustment signal detector falls within the range to adjust the transmission voltage.

* * * * *